(12) United States Patent
Bressler et al.

(10) Patent No.: US 11,897,804 B2
(45) Date of Patent: Feb. 13, 2024

(54) UNIFORMLY PAIR SAGGED GLASS ARTICLES AND HYBRID LAMINATES

(71) Applicant: CORNING INCORPORATED, Corning, NY (US)

(72) Inventors: Douglas Dale Bressler, Julian, PA (US); Rebecca Marie Connors, Corning, NY (US); Sinue Gomez, Corning, NY (US); Timothy Michael Gross, Corning, NY (US); Shane David Seyler, Corning, NY (US); Jason Scott Stewart, Hornell, NY (US); Zhongzhi Tang, Guangdong (CN); Lisa Anne Tietz Moore, Corning, NY (US)

(73) Assignee: Corning Incorporated, Corning, NY (US)

( * ) Notice: Subject to any disclaimer, the term of this patent is extended or adjusted under 35 U.S.C. 154(b) by 793 days.

(21) Appl. No.: 17/046,945

(22) PCT Filed: Apr. 12, 2019

(86) PCT No.: PCT/US2019/027142
§ 371 (c)(1),
(2) Date: Oct. 12, 2020

(87) PCT Pub. No.: WO2019/200203
PCT Pub. Date: Oct. 17, 2019

(65) Prior Publication Data
US 2021/0155523 A1 May 27, 2021

Related U.S. Application Data

(60) Provisional application No. 62/657,435, filed on Apr. 13, 2018.

(51) Int. Cl.
*B32B 15/04* (2006.01)
*B32B 17/06* (2006.01)
(Continued)

(52) U.S. Cl.
CPC .......... *C03B 23/0252* (2013.01); *B32B 7/027* (2019.01); *B32B 17/1055* (2013.01);
(Continued)

(58) Field of Classification Search
CPC ..................... B32B 17/10119; B32B 7/027
(Continued)

(56) References Cited

U.S. PATENT DOCUMENTS 5,910,371 A 6/1999 Francel et al.
6,582,799 B1 * 6/2003 Brown .............. B32B 17/10036
428/34

(Continued)

FOREIGN PATENT DOCUMENTS

EP 2695864 A1 2/2014
JP 57-061646 A 4/1982
(Continued)

OTHER PUBLICATIONS

Japanese Patent Application No. 2020-556242, Office Action dated Feb. 10, 2023, 16 pages (English translation only), Japanese Patent office.
(Continued)

*Primary Examiner* — Lauren R Colgan

(57) ABSTRACT

A laminate includes a first glass article having a first thickness, a first annealing point, and a first softening point, a second glass article having a second thickness, a second annealing point, and a second softening point, and an interlayer disposed between the first glass article and the second glass article. The first thickness is greater than the second thickness, the second annealing point is less than or
(Continued)

equal to the first annealing point, and the second softening point is greater than the first softening point.

29 Claims, 7 Drawing Sheets

(51) Int. Cl.
*C03B 23/025* (2006.01)
*B32B 17/10* (2006.01)
*C03C 3/085* (2006.01)
*C03C 3/091* (2006.01)
*B32B 7/027* (2019.01)
*C03C 3/097* (2006.01)
*C03C 27/10* (2006.01)

(52) U.S. Cl.
CPC .......... *B32B 17/10119* (2013.01); *B32B 17/10137* (2013.01); *C03C 3/085* (2013.01); *C03C 3/091* (2013.01); *C03C 3/097* (2013.01); *C03C 27/10* (2013.01); *B32B 2605/08* (2013.01)

(58) Field of Classification Search
USPC ........................................ 428/428
See application file for complete search history.

(56) References Cited

U.S. PATENT DOCUMENTS

| | | | | |
|---|---|---|---|---|
| 9,812,111 | B1* | 11/2017 | Lu | B32B 17/10036 |
| 10,960,648 | B2* | 3/2021 | Mitamura | B32B 17/10559 |
| 10,981,357 | B2* | 4/2021 | Peck | C03C 3/093 |
| 11,384,013 | B2* | 7/2022 | Mitamura | B32B 17/10 |
| 2010/0035745 | A1 | 2/2010 | Murata | |
| 2012/0328843 | A1* | 12/2012 | Cleary | C03C 3/095 428/213 |
| 2014/0065374 | A1* | 3/2014 | Tsuchiya | B32B 17/10761 428/174 |
| 2015/0140325 | A1 | 5/2015 | Gross et al. | |
| 2015/0202854 | A1* | 7/2015 | Tsuchiya | B32B 1/00 428/179 |
| 2016/0257094 | A1* | 9/2016 | Lestringant | B32B 17/10119 |
| 2018/0148368 | A1* | 5/2018 | Gomez | C03C 27/10 |
| 2018/0148369 | A1* | 5/2018 | Gross | B32B 17/06 |
| 2018/0207911 | A1 | 7/2018 | Lampman et al. | |
| 2018/0370194 | A1* | 12/2018 | Claireaux | B32B 17/10119 |
| 2019/0134953 | A1 | 5/2019 | Oh et al. | |

FOREIGN PATENT DOCUMENTS

| | | |
|---|---|---|
| JP | 2003-500260 A | 1/2003 |
| JP | 2008-115072 A | 5/2008 |
| JP | 2013-533838 A | 8/2013 |
| JP | 2016-538221 A | 12/2016 |
| JP | 2019-503967 A | 2/2019 |
| WO | 2012/137742 A1 | 10/2012 |
| WO | 2017/103471 A1 | 6/2017 |
| WO | 2017/183382 A1 | 10/2017 |

OTHER PUBLICATIONS

Chinese Patent Application No. 201980036213.0, Office Action, dated Jul. 18, 2022, 14 pages, (8 pages of English Translation and 6 pages of Original Copy); Chinese Patent Office.

International Search Report and Written Opinion of the International Searching Authority; PCT/US19/27142; dated Jul. 19, 2019; 10 Pages; European Patent Office.

* cited by examiner

UNIFORMLY PAIR SAGGED GLASS ARTICLES AND HYBRID LAMINATES

CROSS-REFERENCE TO RELATED APPLICATIONS

This application is a national stage application under 35 U.S.C. § 371 of International Application No. PCT/US2019/027142, filed on Apr. 12, 2019, which claims the benefit of priority of U.S. Provisional Application Ser. No. 62/657,435 filed on Apr. 13, 2018 the contents of which are relied upon and incorporated herein by reference in their entirety as if fully set forth below.

BACKGROUND

This disclosure relates to glass compositions and laminates, and more particularly to glass compositions, glass articles and laminates exhibiting bending properties for use in automotive and architectural applications.

Glass is used in windows due to its optical clarity and durability. Automotive and architectural windows (or glazing) may include a single glass article (in sheet form) referred to as a monolith, or a laminate that includes two glass articles (in sheet form) with an interlayer of a polymeric material disposed in between. This glazing can be used as a windshield, side lite, rear window, sunroofs and the like in automotive applications. Architectural applications may utilize similar glazings in buildings, panels, walls and the like.

In vehicle design and manufacture, there is a trend toward using lightweight laminate glazing to improve fuel economy. For example, new glazing designs include a thicker outer glass article and a thinner inner glass article. In one construction, the thicker glass article is soda-lime glass and the thinner glass article is a strengthened glass article. The soda-lime glass articles can be annealed but not otherwise strengthened to a level believed acceptable to compensate for strength degradation due to reduction in thickness. For example, even when chemically strengthened, soda-lime glass articles do not exhibit sufficient strength attributes (in terms of compressive stress and depth of compressive stress).

Thermal tempering is commonly used to strengthen thick, monolithic glass articles and has the advantage of creating a deep compressive layer on the glass surface, typically 21% of the overall glass thickness; however the magnitude of the compressive stress is relatively low, typically less than 100 MPa. Furthermore, thermal tempering becomes increasingly ineffective for thin glass articles (i.e., glass articles having a thickness of less than 2 mm). As such, standard thermal tempering process(es) are suitable for strengthening soda-lime glass articles having a thickness of about 3 mm but not thin soda-lime glass articles. Moreover, soda-lime glass articles have poor chemical strengthening characteristics.

Aluminosilicate glass articles are uniquely suited for use as the thinner glass article. In particular, aluminosilicate glasses can have compositions that can be formed into very thin glass articles via down draw processes (such as fusion forming processes). Moreover, aluminosilicate glass articles can be strengthened (in particular, chemical strengthened) to exhibit a wide range of compressive stresses (e.g., up to and even exceeding 1,000 MPa) and deep depths of compressive stress (e.g., up to and even exceeding 18% or 20% or the thickness of the glass articles).

The glass articles that form these laminates may comprise a curved shaped and may be shaped by thermally shaping the glass articles, for example, using a sagging process. However, known aluminosilicate glasses tend to exhibit high viscosity relative to soda-lime glass articles at the temperature at which soda-lime glass is typically sagged. Accordingly, this viscosity difference means known aluminosilicate glass articles must be sagged separately from soda-lime glass articles and cannot be pair sagged (i.e., sagged together in a stack), adding cost, time, and energy use to the overall manufacturing process. Further, sagging the glass articles of a single laminate separately could result in a shape mismatch between the two glass articles from the separate sagging steps.

Accordingly, there is a need for glass articles having differing properties (e.g., composition, strength, annealing point, softening point, thickness, or the like) that can be pair sagged and formed into a laminate.

SUMMARY

According to one embodiment, a laminate includes a first glass article having a first thickness, a first annealing point ($T_{A1}$), and a first softening point ($T_{S1}$), a second glass article having a second thickness, a second annealing point ($T_{A2}$), and a second softening point ($T_{S2}$), and an interlayer disposed between the first glass article and the second glass article. The first thickness is greater than the second thickness, the second annealing point ($T_{A2}$) is less than or equal to the first annealing point ($T_{A1}$), and the second softening point ($T_{S2}$) is greater than the first softening point ($T_{S1}$).

In another embodiment a laminate includes a first glass article having a first thickness, a first annealing point ($T_{A1}$), and a first softening point ($T_1$), a second glass article comprising a second thickness, a second annealing point ($T_{A2}$), and a second softening point ($T_{S2}$), and an interlayer disposed between the first glass article and the second glass article. The first thickness is greater than the second thickness, the second softening point ($T_{S2}$) is greater than the first softening point ($T_1$), and $$\frac{T_{A1} + T_{S1}}{2} \le \frac{T_{A2} + T_{S2}}{2} \le \left(\frac{T_{A1} + T_{S1}}{2} + 50°\ C.\right)$$

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
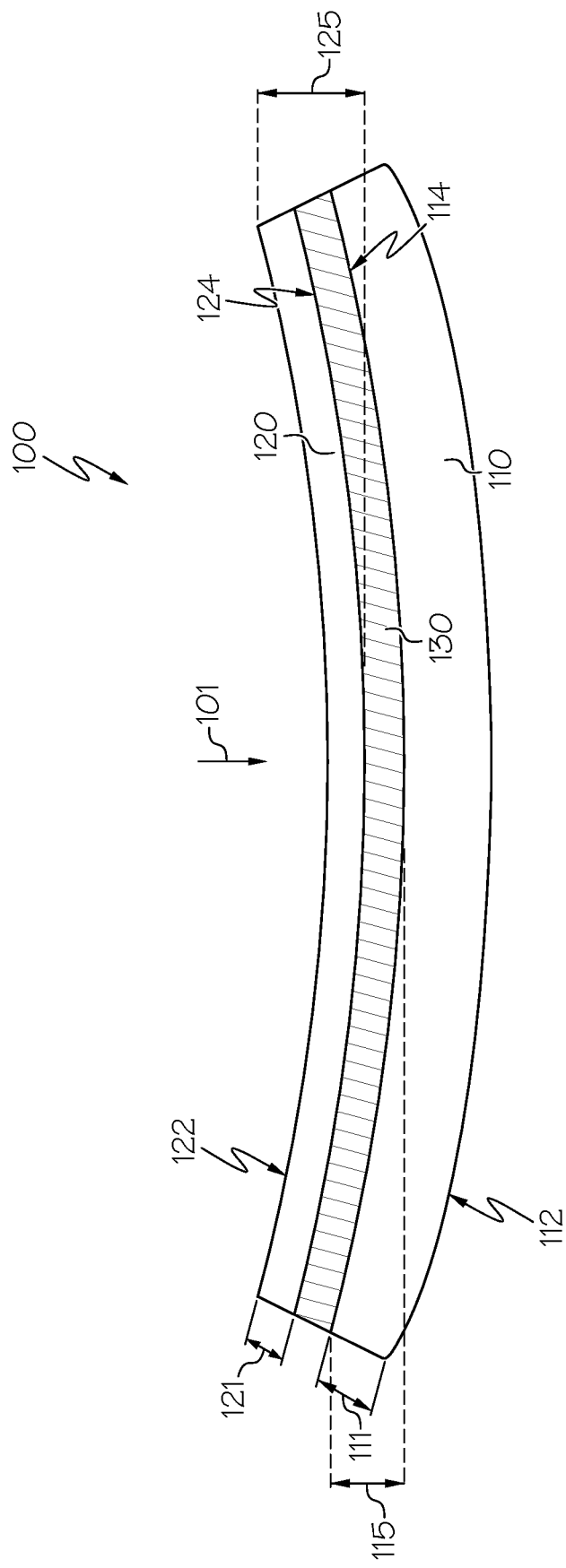
FIG. 1 is a side view illustration of a laminate that includes a first glass article and a second glass article with an interlayer positioned therebetween, according to one or more embodiments shown and described herein.

Reference will now be made in detail to various embodiments of laminates and glass articles, examples of which are illustrated in the accompanying drawings. Whenever possible, the same reference numerals will be used throughout the drawings to refer to the same or like parts. Aspects of this disclosure pertain to a glass article that can be uniformly pair sagged with another glass article having differing properties (e.g., composition, strength, annealing point, softening point, thickness, or the like) and formed into a laminate. In one or more embodiments, the glass articles described herein may be float formed glass, fusion formed glass, or the like. As used herein, "fusion formed glass" refers to glass formed using a fusion process and "float formed glass" refers to glass sheets made using a float process, for example, soda-lime glass sheets. In some embodiments, the glass articles described herein may be components of a laminate that includes two glass articles (in sheet form) with an interlayer of a polymeric material disposed in between. Laminates may be used as an automotive glazing, such as a windshield, an architectural glazing, or the like. Typically, an automotive glazing is curved or bent, and is not flat or planar. Further, an architectural glazing may be similarly curved.

As used herein, "simple curve" or "simply curved" means a non-planar shape having curvature along one axis (forming a cylindrical shape or bend). As used herein, "complex curve" and "complexly curved" mean a non-planar shape having curvature along two orthogonal axes that are different from one another. Examples of complexly curved shapes include having simple or compound curves, also referred to as non-developable shapes, which include but are not limited to spherical, aspherical, and toroidal. The complexly curved shapes may also include segments or portions of such surfaces, or be comprised of a combination of such curves and surfaces. Moreover, a complexly curved laminate according to one or more embodiments may have a distinct radius of curvature in two independent directions.

According to one or more embodiments, complexly curved laminates may thus be characterized as having "cross curvature," where the laminate is curved along an axis (i.e., a first axis) that is parallel to a given dimension and also curved along an axis (i.e., a second axis) that is perpendicular to the same dimension. The curvature of the laminate can be even more complex when a significant minimum radius is combined with a significant cross curvature, and/or depth of bend. Some laminates may also include bending along axes that are not perpendicular to one another. Further, as used herein, "flat" and "planar" are used interchangeably and mean a shape having curvature less than a curvature at which lamination defects are created due to curvature mismatch, when such a flat layer is cold-formed to another layer (i.e., a radius of curvature of greater than or equal to about 3 meters, greater than or equal to about 4 meters or greater than or equal to about 5 meters). A flat layer has the foregoing shape when placed on a surface.

Referring now to FIG. 1, a laminate 100 comprising a first glass article 110, a second glass article 120, and an interlayer 130 disposed between the first glass article 110 and the second glass article 120 is schematically depicted. The first glass article 110 may comprise soda-lime glass and the second glass article 120 may comprise alkali aluminosilicate glass, alkali containing borosilicate glass, alkali alumino-phosphosilicate glass, or alkali aluminoborosilicate glass. In some embodiments, the first glass article 110 and/or the second glass article 120 may be float-formed or fusion-formed, for example, the first glass article 110 may comprise float-formed glass and the second glass article 120 may comprise fusion formed glass. Further, the interlayer 130 of the laminate 100 may include a single layer or multiple layers. The interlayer 130 may be formed polymers such as polyvinyl butyral (PVB), acoustic PVB (APVB), ionomers, ethylene-vinyl acetate (EVA), thermoplastic polyurethane (TPU), polyester (PE), polyethylene terephthalate (PET) and the like.

The first glass article 110 comprises a first major surface 112 (i.e., an outer surface) and a second major surface 114 opposite the first major surface 112 and in contact with the interlayer 130 (i.e., an inner surface). The second glass article 120 comprises a first major surface 122 (i.e., an outer surface) and a second major surface 124 opposite the second major surface 124 in contact with the interlayer 130 (i.e., an inner surface). As depicted in FIG. 1, both the first and second major surfaces 112, 114 of the first glass article 110 and the first and second major surfaces 122, 124 of the second glass article 120 are curved. In some embodiments, one or more of the major surfaces 112, 114, 122, 124 of the first and second glass articles 110, 120 may exhibit at least one radius of curvature along at least one axis (e.g., a first axis) that is about 10 m or less, about 5 m or less, about 2.5 m or less, about 1 m or less, about 750 mm or less, about 500 mm or less, about 300 mm or less, or the like. Further, one or more of the major surfaces 112, 114, 122, 124 of the first and second glass articles 110, 120 may exhibit any of the above listed radii of curvatures along a second axis which in some embodiments is perpendicular to the first axis and in other embodiments is not perpendicular to the first axis.

In some embodiments, a method of making the laminate 100 includes forming the first and second glass articles 110, 120 (e.g., float-forming, down-drawing, or the like), cutting and finishing the first glass article 110 and the second glass article 120 and thermally shaping the glass articles, for example, using a sagging process, which uses gravity to shape the glass when it is heated. In the sagging process, the first and second glass articles 110, 120 are placed on top of another glass article forming a stack (with a potential release layer, such as talc powder), which is placed on a mold. The stack and mold are both heated by placing in a furnace (e.g., a box furnace, a lehr furnace, or the like) in which the stack is gradually heated to a temperature at which the glass articles 110, 120 sag together to the desired shape. The heating time and temperature are selected to obtain the desired degree of sagging and final shape. Further, the method of making the laminate 100 may include separating the first and second glass articles 110, 120 (typically after the first and second glass articles 110, 120 are cooled), applying the interlayer 130 between the first and second glass article 110, 120, and heating the three-layer stack (including the two pair sagged glass articles and intervening interlayer) under vacuum together to seal the first glass article, the interlayer 130, and the second glass article 120 into the laminate 100.

Figure 2:
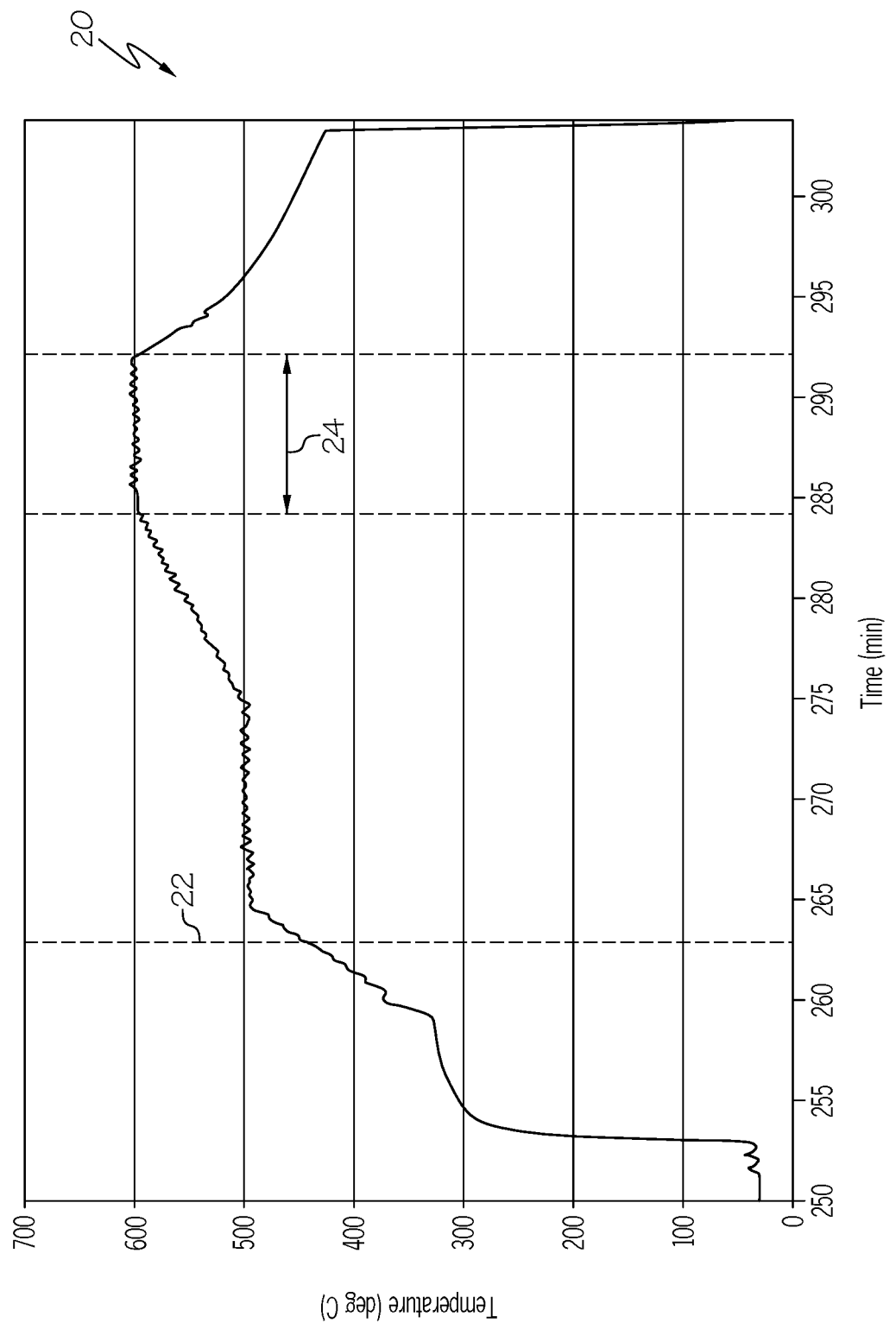
FIG. 2 graphically depicts a box furnace heating schedule according to one or more embodiments shown and described herein.

In some embodiments, heating the first and second glass articles 110, 120 in a box furnace may comprise placing the first and second glass articles 110, 120 with a release layer such as talc powder therebetween in a stack on a ring mold (which may be a preheated ring mold) then placed in the box furnace. In some embodiments, the ring mold may be preheated before the stack is placed on the ring mold. When the stack is placed in the box furnace, the box furnace may be preheated, for example, to a temperature of about 450° C. Referring now to FIG. 2, an example box furnace heating schedule 20 is graphically depicted. The box furnace heating schedule 20 includes a stack entrance point 22 (i.e., the time at which the stack is placed in the box furnace). The temperature at the stack entrance point 22 is about 450° C. The box furnace heating schedule 20 further includes a holding period 24 (i.e., the period of time at which the box furnace is held at the maximum temperature of the box furnace heating schedule 20). The maximum temperature is about 600° C. and the holding period 24 is about 7 minutes.

Figure 3:
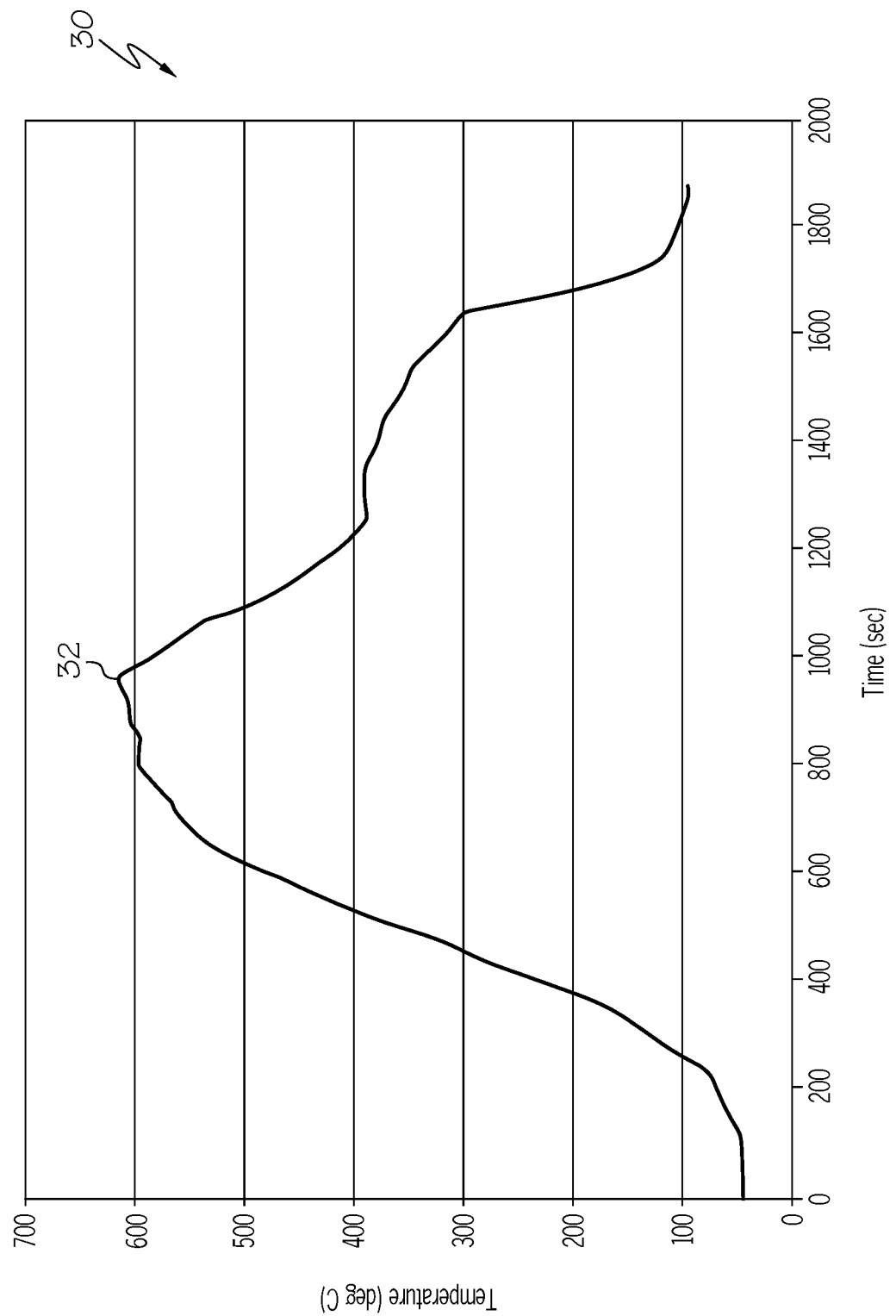
FIG. 3 graphically depicts a lehr furnace heating schedule according to one or more embodiments shown and described herein.

In other embodiments, heating the first and second glass articles 110, 120 in a lehr furnace may comprise placing the first and second glass articles 110, 120 with a release layer therebetween in a stack on a ring mold, which is located on a wagon or thereafter placed on a wagon. In some embodiments, the ring mold may be preheated before the stack is placed on the ring mold. In operation, the wagon is moved progressively through one or more preheating zones of the lehr furnace. After the preheating zones, the wagon traverses heating zones (for example, two heating zones), where the stack of first and second glass articles 110, 120 are heated to their sag temperature. Thereafter, the stack of first and second glass articles 110, 120 may be cooled in stages. Referring now to FIG. 3, an example lehr furnace heating schedule 30 is graphically depicted. As shown in FIG. 3, the lehr furnace heating schedule 30 includes a maximum temperature 32 of about 605° C.

Referring again to FIG. 1, the first glass article 110 comprises a first thickness 111 defined as the distance between the first major surface 112 and the second major surface 114. The second glass article 120 comprises a second thickness 121 defined as the distance between the first major surface 122 and the second major surface 124. The first thickness 111 and/or the second thickness 121 may be constant along one or more dimensions or may vary along one or more dimensions for aesthetic and/or functional reasons. For example, the edges of the first glass article 110 and/or a second glass article 120 may be thicker as compared to more central regions of the first glass article 110 and/or a second glass article 120. In some embodiments, the first thickness 111 is greater than the second thickness 121. For example, the first thickness 111 is in the range from about 1.5 times to about 10 times the second thickness 121, for example, from about 2 times to about 7.5 times, from about 2.5 times to about 10 times, from about 4 times to about 10 times, from about 1.5 times to about 8 times, from about 1.5 times to about 6 times, from about 1.5 times to about 4 times, from about 1.5 times to about 3.5 times, or the like and all ranges and sub-ranges therebetween. In other embodiments, the first glass article 110 and the second glass article 120 may have the same thickness.

In some embodiments, the first thickness 111 may comprise from about 1 mm to about 6 mm, for example, from about 1.5 mm to about 4 mm, from about 2 mm to about 3 mm, 1 mm to about 3 mm, 2 mm to about 2.5 mm, and any combination or sub-combination of ranges therebetween. For example, the first thickness 111 may comprise 1.1 mm, 1.2 mm, 1.3 mm, 1.4 mm 1.5 mm, 1.6 mm, 1.7 mm, 1.8 mm, 1.9 mm, 2 mm, 2.1 mm, 2.2 mm, 2.3 mm, 2.4 mm, 2.5 mm, 2.6 mm, 2.7 mm, 2.8 mm, 2.9 mm, 3 mm, 3.1 mm, 3.2 mm, 3.3 mm, 3.4 mm, 3.5 mm, 3.6 mm, 3.7 mm, 3.8 mm, 3.9 mm, 4 mm, 4.1 mm, 4.2 mm, 4.3 mm, 4.4 mm, 4.5 mm, 4.6 mm, 4.7 mm, 4.8 mm, 4.9 mm, 5 mm, 5.1 mm, 5.2 mm, 5.3 mm, 5.4 mm, 5.5 mm, 5.6 mm, 5.7 mm, 5.8 mm, 5.9 mm, or the like. In some embodiments, the second thickness 121 comprises from about 0.1 mm to about 2 mm, for example, from about 0.2 mm to about 1.5 mm, from about 0.2 to about 1 mm, from about 0.3 mm to about 1 mm, from about 0.4 mm to about 0.8 mm, from about 0.5 mm to about 0.8 mm, and any combination or sub-combination or ranges therebetween. For example, the second thickness 121 may comprise 0.2 mm, 0.3 mm, 0.4 mm, 0.5 mm, 0.55 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, or the like. Moreover, the thickness of the interlayer 130 may be in the range of from about 0.5 mm to about 2.5 mm, from about 0.8 mm to about 2.5 mm, from about 1 mm to about 2.5 mm or from about 1.5 mm to about 2.5 mm and all ranges and sub-ranges therebetween Further, as the first and second glass articles 110, 120 are curved, the first glass article 110 comprises a first sag depth 115 and the second glass article 120 comprises a second sag depth 125. As used herein, "sag depth" refers to the distance in a sagging direction 101 between an edge of a major surface of a glass article and a center point of the same major surface of the glass article. In some embodiments, one or both the first sag depth 115 and the second sag depth 125 is about 1 mm or greater. For example, one or both the first sag depth 115 and the second sag depth 125 may be in a range from about 1 mm to about 30 mm, from about 2 mm to about 25 mm, from about 5 mm to about 20 mm, from about 6 mm to about 15 mm, from about 8 mm to about 120 mm, from about 1 mm to about 10 mm, from about 8 mm to about 30 mm, from about 15 mm to about 30 mm, or the like and all ranges, sub-ranges, and values therebetween. In some embodiments, the first sag depth 115 is within 10% of the second sag depth 125. For example, the first sag depth 115 is within 9%, within 8%, within 7%, within 6%, within 5%, within 4%, within 3%, within 2%, or within 1% of the second sag depth 125 and all ranges, sub-ranges, and values therebetween.

Further, in one or more embodiments, the first sag depth 115 and the second sag depth 125 are substantially equal and the first glass article 110 and the second glass article 120 may each comprise a substantially identical curved shape such that minimal to no gap is disposed between the first glass article 110 and the second glass article 120 when the first glass article 110 and the second glass article 120 are stacked in contact. However, when two glass articles are pair sagged but do not pair sag uniformly, one or more gaps may form between the glass articles. For example, portions of the first glass article 110 and the second glass article 120 may be undersagged or oversagged relative to a target baseline. Undersagging and oversagging may cause one or more gaps 105 (FIG. 4) to form between the first glass article 110 and the second glass article 120.

Figure 4:
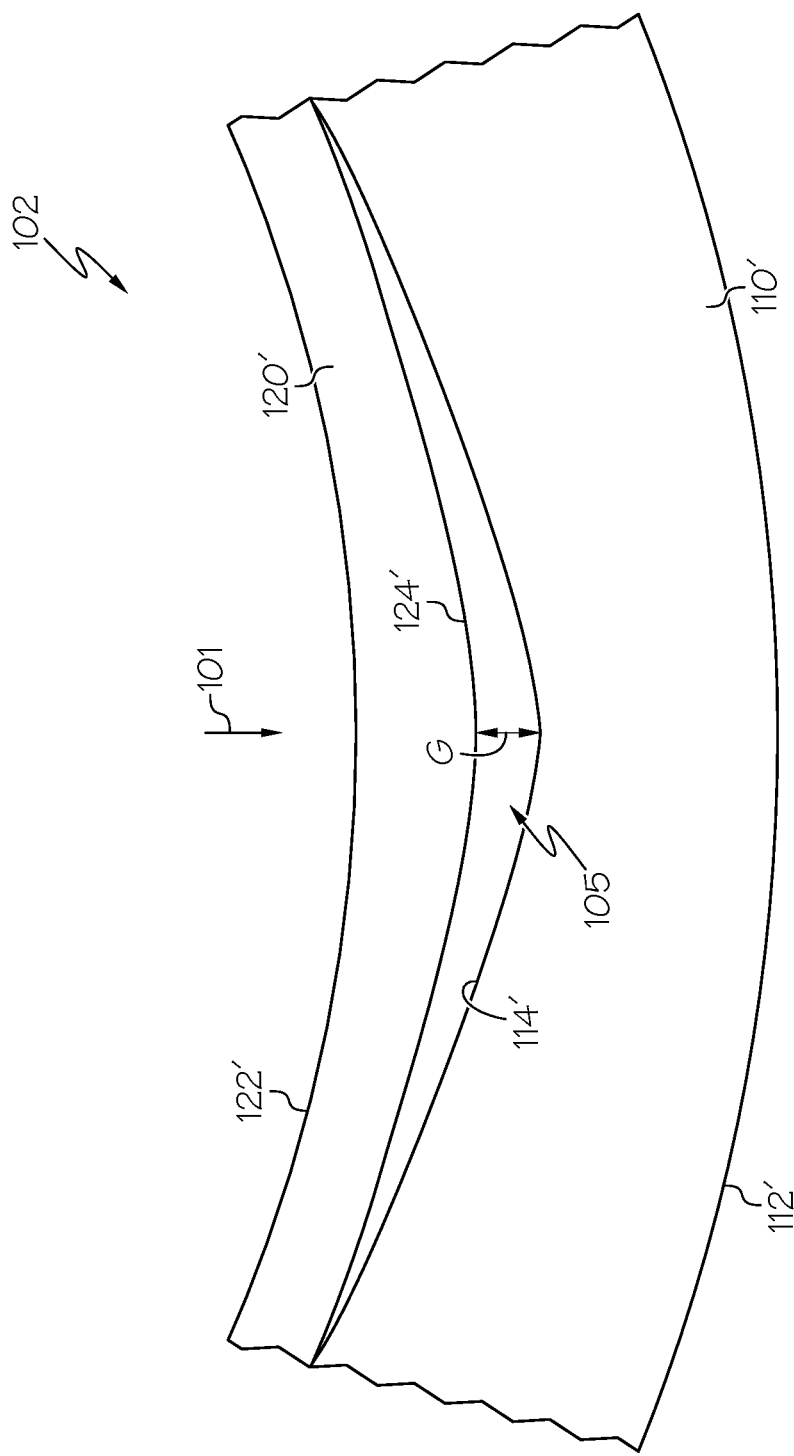
FIG. 4 is a side view illustration of a sheet stack that includes a first glass article and a second glass article having a gap disposed therebetween, according to one or more embodiments shown and described herein.

For example, FIG. 4 depicts an example first glass article 110', having a first major surface 112' opposite a second major surface 114', and an example second glass article 120', having a first major surface 122' opposite a second major surface 124', shown in a sheet stack 102 without the interlayer 130. FIG. 4 also depicts a gap 105 between the first glass article 110' and the second glass article 120' that comprises a gap distance G. As used herein, "gap distance" refers to the distance measured in a sagging direction 101 of the largest distance between two facing major surfaces of two glass articles when the two glass articles are stacked together and are in partial contact. For example, in the embodiment depicted in FIG. 4, the gap 105 with gap distance G extends between the second major surface 114' of the first glass article 110' and the second major surface 124' of the second glass article 120'. While the gap distance G is depicted in FIG. 4 extending between a central location (e.g., a center point) of the first and second glass article 110, 120, it should be understood that the largest distance between two major surfaces in a particular gap 105 may be away from the center, for example, when gaps 105 are formed between other portions of two major surfaces of the first and second glass articles 110, 120. In some embodiments, the gap distance G may comprise about 5 mm or less, for example, 4.5 mm or less, 4 mm or less, 3.5 mm or less, 3 mm or less, 2.5 mm or less, 2 mm or less, 1.5 mm or less, 1 mm or less, 0.8 mm or less, 0.6 mm or less, 0.5 mm or less, 0.4 mm or less, 0.3 mm or less, 0.2 mm or less, 0.1 mm or less, 0.05 mm or less, 0.025 mm or less, 0.001 mm or less, or the like and all ranges, sub-ranges, and values therebetween.

While not intending to be limited by theory, one or more gaps 105 may form when the first and second glass articles 110, 120 are pair sagged and comprise different viscosities at the temperature at which they are pair sagged. In view of this challenge, the first glass article 110 and the second glass article 120 of the embodiments described herein may comprise a thickness relationship, an annealing point relationship, a softening point relationship, or combinations thereof, to facilitate pair sagging with minimal to no gap distance G between the first glass article 110 and the second glass article 120.

In particular, the first glass article 110 comprises a first annealing point ($T_{A1}$) and the second glass article 120 comprises a second annealing point ($T_{A2}$). As used herein, "annealing point" refers to a temperature at which the viscosity of the glass article is about $1 \times 10^{13.2}$ poise and may be determined using the beam bending viscosity (BBV) method of ASTM C598-93 (2013). Further, the first glass article comprises a first softening point ($T_{S1}$), and the second glass article 120 comprises a second softening point ($T_{S2}$). As used herein, "softening point" refers to a temperature at which the viscosity of the glass article is $1 \times 10^{7.6}$ poise and may be determined using the parallel plate viscosity method of ASTM C1351M-96 (2012).

As one example, to facilitate uniform pair sagging with minimal to no gaps 105 each (if present) forming minimal gap distance G between the first glass article 110 and the second glass article 120, the first thickness 111 may be greater than the second thickness 121, the second annealing point ($T_{A2}$) may be less than or equal to the first annealing point ($T_{A1}$) and the second softening point ($T_{S2}$) may be greater than the first softening point ($T_{S1}$). As another example, to facilitate uniform pair sagging and minimal to no gap distance G between the first glass article 110 and the second glass article 120, the first thickness 111 may be greater than the second thickness 121, the second softening point ($T_{S2}$) may be greater than the first softening point ($T_{S1}$) and the first annealing point ($T_{A1}$), the second annealing point ($T_{A2}$), the first softening point ($T_{S1}$), and the second softening point ($T_{S2}$) may exhibit the following relationship $T_{A1}+T_{S1}/2 \le T_{A2}+T_{S2}/2 \le (T_{A1}+T_{S1}/2+50°$ C.). Furthermore, the relationship between the first annealing point ($T_{A1}$), the second annealing point ($T_{A2}$), the first softening point ($T_{S1}$), and the second softening point ($T_{S2}$) may be $T_{A1}+T_{S1}/2 \le T_{A1}+T_{S1}/2 \le (T_{A1}+T_{S1}/2+40°$ C.), $T_{A1}+T_{S1}/2 \le T_{A2}+T_{S2}/2 \le (T_{A1}+T_{S1}/2+30°$ C.), $T_{A1}+T_{S1}/2 \le T_{A2}+T_{S2}/2 \le (T_{A1}+T_{S1}/2+20°$ C.), $T_{A1}+T_{S1}/2 \le T_{A2}+T_{S2}/2 \le (T_{A1}+T_{S1}/2+10°$ C.), $T_{A1}+T_{S1}/2 \le T_{A2}+T_{S2}/2 \le (T_{A1}+T_{S1}/2+5°$ C.), $T_{A1}+T_{S1}/2 \le T_{A2}+T_{S2}/2 \le (T_{A1}+T_{S1}/2+2°$ C., $T_{A1}+T_{S1}/2 \le T_{A2}+T_{S2}/2 \le (T_{A1}+T_{S1}/2+1°$ C.), or the like and all ranges, sub-ranges, and values therebetween. Example properties of the first glass article 110 and the second glass article 120 will now be described.

In some embodiments, the first annealing point ($T_{A1}$) is from about 535° C. to about 550° C. and all ranges, sub-ranges, and values therebetween, such as about, 536° C., 537° C., 538° C., 539° C., 540° C., 541° C., 542° C., 543° C., 544° C., 545° C., 546° C., 547° C., 549° C., 544° C., or the like. In some embodiments, the second annealing point ($T_{A2}$) is from about 510° C. to about 610° C. and all ranges, sub-ranges, and values therebetween. In one or more embodiments, the second annealing point ($T_{A2}$) is less than about 580° C., less than about 570° C., less than about 560° C., less than about 550° C., less than about 540° C., less than about 530° C., less than about 525° C., or the like. For example, the second annealing point ($T_{A2}$) may be in a range from about 520° C. to about 610° C., from about 530° C. to about 610° C., from about 540° C. to about 610° C., from about 550° C. to about 610° C., from about 560° C. to about 610° C., from about 510° C. to about 600° C., from about 510° C. to about 590° C., from about 510° C. to about 580° C., from about 510° C. to about 570° C., from about 510° C. to about 560° C., from about 510° C. to about 550° C., from about 510° C. to about 540° C., from about 520° C. to about 535° C., or from about 530° C. to about 570° C., and all ranges and sub-ranges therebetween.

In some embodiments, the first softening point ($T_{S1}$) is from about 715° C. to about 735° C. and all ranges, sub-ranges, and values therebetween, such as about 716° C., 717° C., 718° C., 719° C., 720° C., 721° C., 722° C., 723° C., 724° C., 725° C., 726° C., 727° C., 728° C., 729° C., 730° C., 731° C., 732° C., 733° C., 734° C., or the like. In some embodiments, the second softening point ($T_{S2}$) is from about 760° C. and 850° C. In some embodiments, the second softening point ($T_{S2}$) is less than about 800° C., less than about 795° C., less than about 790° C., less than about 785° C., less than about 780° C., or the like. The second softening point ($T_{S2}$) may be in a range from about 770° C. to about 850° C., from about 780° C. to about 850° C., from about 790° C. to about 850° C., from about 800° C. to about 850° C., from about 810° C. to about 850° C., from about 820° C. to about 860° C., from about 770° C. to about 840° C., from about 770° C. to about 830° C., from about 770° C. to about 820° C., from about 770° C. to about 810° C., from about 775° C. to about 820° C., from about 785° C. to about 810° C., from about 775° C. to about 800° C., from about 780° C. to about 805° C., from about 780° C. to about 800° C., from about 785° C. to about 805° C., from about 785° C. to about 800° C., and all ranges, sub-ranges, and values therebetween.

In one or more embodiments, the first glass article 110 exhibits a difference in magnitude between the annealing point and the softening point (i.e. a difference in magnitude between the first annealing point ($T_{A1}$) and first softening point ($T_1$)) of from about 180° C. to about 190° C. and all ranges, sub-ranges, and values therebetween, such as about 180° C. to about 185° C., 180° C. to about 184° C., and all ranges and subranges therebetween, for example 181° C., 182° C., 183° C., 184° C., 185° C., 186° C., 187° C., 188° C., 189° C., or the like. Further, the second glass article 120 exhibits a difference in magnitude between the annealing point and the softening point (i.e. a difference in magnitude between the second annealing point ($T_{A2}$) and second softening point ($T_{S2}$)) of from about 230° C. to about 280° C., for example from about 240° C. to about 280° C., from about 250° C. to about 280° C., from about 260° C. to about 280° C., from about 260° C. to about 270° C., and all ranges, subranges and values therebetween, for example, 232° C., 234° C., 236° C., 237° C., 238° C., 240° C., 242° C., 244° C., 246° C., 248° C., 250° C., 252° C., 254° C., 255° C., 256° C., 257° C., 258° C., 259° C., 260° C., 262° C., 264° C., 265° C., 266° C., 268° C., 270° C., 272° C., 274° C., 276° C., 278° C., 279° C., or the like.

Further, a relationship between the first annealing point ($T_{A1}$) and the first softening point ($T_{S1}$) of ($T_{A1}$+$T_{S1}$/2) is from about 620° C. to about 640° C., for example, from about 625° C. to about 635° C., from about 628° C. to about 632° C., and all ranges, subranges, and values therebetween, for example, 621° C., 622° C., 623° C., 624° C., 625° C., 626° C., 627° C., 628° C., 629° C., 630° C., 631° C., 632° C., 633° C., 634° C., 635° C., 636° C., 637° C., 638° C., 639° C., or the like. A relationship between the second annealing point ($T_{A2}$) and the second softening point ($T_{S2}$) of ($T_{A2}$+$T_{S2}$/2) is from is from about 650° C. to about 725° C., for example, from about 650° C. to about 700° C., from about 650° C. to about 690° C., from about 650° C. to about 680° C., from about 650° C. to about 670° C., from about 655° C. to about 705° C., from about 655° C. to about 695° C., from about 655° C. to about 680° C., from about 655° C. to about 675° C., from about 660° C. to about 675° C., from about 660° C. to about 670° C., from about 665° C. to about 695° C., from about 675° C. to about 695° C., or the like, and all ranges, sub-ranges, and values therebetween, for example, about 652° C., 654° C., 655° C., 656° C., 658° C., 660° C., 661° C., 662° C., 663° C., 664° C., 665° C., 666° C., 667° C., 668° C., 669° C., 670° C., 671° C., 672° C., 673° C., 674° C., 675° C., 676° C., 677° C., 678° C., 679° C., 670° C., 672° C., 674° C., 675° C., 676° C., 678° C., 680° C., 682° C., 683° C., 684° C., 685° C., 686° C., 687° C., 688° C., 670° C., 672° C., 674° C., 675° C., 676° C., 678° C., 680° C., 682° C., 684° C., 685° C., 686° C., 688° C., 690° C., 691° C., 692° C., 694° C., 695° C., 696° C., 698° C., 700° C., 702° C., 704° C., 705° C., 706° C., 708° C., 710° C., 712° C., 713° C., 714° C., 715° C., 716° C., 718° C., 720° C., 722° C., 724° C., or the like.

Furthermore, the first glass article 110 comprises a first strain point ($T_{Sr1}$) and the second glass article 120 comprises a second strain point ($T_{Sr2}$). As used herein, "strain point" refers to a temperature at which the viscosity of the glass article is $1 \times 10^{14.7}$ poise and may be determined using the beam bending viscosity (BBV) method of ASTM C598-93 (2013). In some embodiments, the first strain point ($T_{Sr1}$), is from about 495° C. to about 505° C. and all ranges, sub-ranges, and values therebetween, such as about 496° C., 497° C., 498° C., 499° C., 500° C., 501° C., 502° C., 503° C., 504° C., or the like. In some embodiments, the second strain point ($T_{Sr2}$) is from about 460° C. to about 560° C. and all ranges, sub-ranges, and values therebetween. In one or more embodiments, the second strain point ($T_{Sr2}$) is in a range from about 465° C. to about 560° C., from about 470° C. to about 560° C., from about 475° C. to about 560° C., from about 480° C. to about 560° C., from about 485° C. to about 560° C., from about 490° C. to about 560° C., from about 495° C. to about 560° C., from about 500° C. to about 560° C., from about 510° C. to about 560° C., from about 520° C. to about 560° C., from about 530° C. to about 560° C., from about 540° C. to about 560° C., from about 460° C. to about 550° C., from about 460° C. to about 540° C., from about 460° C. to about 530° C., from about 460° C. to about 520° C., from about 460° C. to about 510° C., from about 460° C. to about 500° C., from about 460° C. to about 495° C., from about 460° C. to about 490° C., from about 460° C. to about 485° C., from about 460° C. to about 480° C., from about 470° C. to about 490° C., from about 470° C. to about 485° C., from about 470° C. to about 480° C., and all ranges and sub-ranges therebetween. In some instances, the glass composition or glass articles formed from those compositions exhibit a strain point temperature that is less than about 550° C. or less, or about 530° C. or less, or about 520° C. or less, or about 510° C. or less, or about 500° C. or less, or about 490° C. or less.

In one or more embodiments, the first glass article 110 comprises a density at 20° C. of from about 2.4 g/cm³ to about 2.6 g/cm³ and all ranges, sub-ranges, and values therebetween, such as about 2.45 g/cm³ to about 2.55 g/cm³, 2.49 g/cm³ to about 2.51 g/cm³, for example, 2.41 g/cm³, 2.42 g/cm³, 2.43 g/cm³, 2.44 g/cm³, 2.45 g/cm³, 2.46 g/cm³, 2.47 g/cm³, 2.48 g/cm³, 2.49 g/cm³, 2.5 g/cm³, 2.505 g/cm³, 2.507 g/cm³, 2.51 g/cm³, 2.52 g/cm³, 2.53 g/cm³, 2.54 g/cm³, 2.55 g/cm³, 2.56 g/cm³, 2.57 g/cm³, 2.58 g/cm³, 2.59 g/cm³, 2.53 g/cm³, 2.53 g/cm³, 2.53 g/cm³, 2.53 g/cm³, 2.53 g/cm³, or the like. Further, the second glass article 120 comprises a density at 20° C. of from about 2.2 g/cm³ to about 2.4 g/cm³ and all ranges, sub-ranges, and values therebetween, such as about 2.25 g/cm³ to about 2.4 g/cm³, 2.25 g/cm³ to about 2.375 g/cm³, 2.25 g/cm³ to about 2.35 g/cm³, 2.25 g/cm³ to about 2.325 g/cm³, such as about 2.25 g/cm³, 2.26 g/cm³, 2.27 g/cm³, 2.28 g/cm³, 2.285 g/cm³, 2.287 g/cm³, 2.29 g/cm³, 2.3 g/cm³, 2.31 g/cm³, 2.32 g/cm³, 2.321 g/cm³, 2.323 g/cm³, 2.327 g/cm³, 2.33 g/cm³, 2.333 g/cm³, 2.339 g/cm³, 2.34 g/cm³, 2.343 g/cm³, 2.347 g/cm³, 2.35 g/cm³, 2.353 g/cm³, 2.355 g/cm³, 2.36 g/cm³, 2.636 g/cm³, 2.37 g/cm³, 2.38 g/cm³, 2.382 g/cm³, 2.39 g/cm³, 2.396 g/cm³, or the like.

Coefficients of thermal expansion (CTE) represent a value measured over a temperature range from about 20° C. to about 300° C., unless otherwise specified. In some embodiments, the first glass article 110 exhibits a CTE of from about $80 \times 10^{-7}$ °C.$^{-1}$ to about $90 \times 10^{-7}$ °C.$^{-1}$, such as from about $82 \times 10^{-7}$ °C.$^{-1}$ to about $88 \times 10^{-7}$ °C.$^{-1}$, from about $84 \times 10^{-7}$ °C.$^{-1}$ to about $86 \times 10^{-7}$ °C.$^{-1}$, from about $85 \times 10^{-7}$ °C.$^{-1}$ to about $86 \times 10^{-7}$ °C.$^{-1}$, and all ranges, subranges and values therebetween, for example, $80.5 \times 10^{-7}$ °C.$^{-1}$, $81 \times 10^{-7}$ °C.$^{-1}$, $81.5 \times 10^{-7}$ °C.$^{-1}$, $82 \times 10^{-7}$ °C.$^{-1}$, $82.5 \times 10^{-7}$ °C.$^{-1}$, $83 \times 10^{-7}$ °C.$^{-1}$, $83.5 \times 10^{-7}$ °C.$^{-1}$, $84 \times 10^{-7}$ °C.$^{-1}$, $84.5 \times 10^{-7}$ °C.$^{-1}$, $85 \times 10^{-7}$ °C.$^{-1}$, $85.3 \times 10^{-7}$ °C.$^{-1}$, $85.5 \times 10^{-7}$ °C.$^{-1}$, $86 \times 10^{-7}$ °C.$^{-1}$, $86.5 \times 10^{-7}$ °C.$^{-1}$, $87 \times 10^{-7}$ °C.$^{-1}$, $87.5 \times 10^{-7}$ °C.$^{-1}$, $88 \times 10^{-7}$ °C.$^{-1}$, $88.5 \times 10^{-7}$ °C.$^{-1}$, $89 \times 10^{-7}$ °C.$^{-1}$, $89.5 \times 10^{-7}$ °C.$^{-1}$, or the like. Further, the second glass article 120 exhibits CTE of from about $52 \times 10^{-7}$ °C.$^{-1}$ to about $68 \times 10^{-7}$ °C.$^{-1}$, such as from about $52 \times 10^{-7}$ °C.$^{-1}$ to about $65\times10^{-7\circ}$ C.$^{-1}$, from about $52\times10^{-7\circ}$ C.$^{-1}$ to about $55\times10^{-7\circ}$ C.$^{-1}$, from about $58\times10^{-7\circ}$ C.$^{-1}$ to about $68\times10^{-7\circ}$ C.$^{-1}$, $60\times10^{-7\circ}$ C.$^{1}$ to about $68\times10^{-7\circ}$ C.$^{-1}$, $60\times10^{-7\circ}$ C.$^{-1}$ to about $66\times10^{-7\circ}$ C.$^{-1}$, $60\times10^{-7\circ}$ C.$^{-1}$ to about $64\times10^{-7\circ}$ C.$^{-1}$, and all ranges, subranges and values therebetween, for example, $52.5\times10^{-7\circ}$ C.$^{-1}$, $53\times10^{-7\circ}$ C.$^{-1}$, $53.5\times10^{-7\circ}$ C.$^{-1}$, $54\times54.5\times10^{-7\circ}$ C.$^{-1}$, $54.7\times10^{-7\circ}$ C.$^{-1}$, $54.8\times10^{-7\circ}$ C.$^{-1}$, $55\times10^{-7\circ}$ C.$^{-1}$, $55.5\times10^{-7\circ}$ C.$^{-1}$, $56\times10^{-7\circ}$ C.$^{-1}$, $56.5\times10^{-7\circ}$ C.$^{-1}$, $57\times10^{-7\circ}$ C.$^{-1}$, $57.5\times10^{-7\circ}$ C.$^{-1}$, $58\times10^{-7\circ}$ C.$^{-1}$, $58.5\times10^{-7\circ}$ C.$^{-1}$, $58.5\times10^{-7\circ}$ C.$^{-1}$, $59\times10^{-7\circ}$ C.$^{-1}$, $59.5\times10^{-7\circ}$ C.$^{-1}$, $60\times10^{-7\circ}$ C.$^{-1}$, $60.5\times10^{-7\circ}$ C.$^{-1}$, $61\times10^{-7\circ}$ C.$^{-1}$, $61.5\times10^{-7\circ}$ C.$^{-1}$, $62\times10^{-7\circ}$ C.$^{-1}$, $62.5\times10^{-7\circ}$ C.$^{-1}$, $62.9\times10^{-7\circ}$ C.$^{-1}$, $63\times10^{-7\circ}$ C.$^{-1}$, $63.5\times10^{-7\circ}$ C.$^{-1}$, $64\times10^{-7\circ}$ C.$^{-1}$, $64.1\times10^{-7\circ}$ C.$^{-1}$, $64.2\times10^{-7\circ}$ C.$^{-1}$, $64.3\times10^{-7\circ}$ C.$^{-1}$, $64.4\times10^{-7\circ}$ C.$^{-1}$, $64.5\times10^{-7\circ}$ C.$^{-1}$, $64.6\times10^{-7\circ}$ C.$^{-1}$, $64.7\times10^{-7\circ}$ C.$^{-1}$, $64.8\times10^{-7\circ}$ C.$^{-1}$, $64.9\times10^{-7\circ}$ C.$^{-1}$, $65\times10^{-7\circ}$ C.$^{-1}$, $65.5\times10^{-7\circ}$ C.$^{-1}$, $66\times10^{-7\circ}$ C.$^{-1}$, $66.5\times10^{-7\circ}$ C.$^{-1}$, $67\times10^{-7\circ}$ C.$^{-1}$, $67.5\times10^{-7\circ}$ C.$^{-1}$, or the like.

As stated above, the first glass article 110 comprises soda-lime glass and includes $SiO_2$, $Al_2O_3$, $Na_2O$, $K_2O$, MgO, CaO, $Fe_2O_3$, and $TiO_2$. In particular, the first glass article 110 includes $SiO_2$ in a range of from about 68 mol % to about 78 mol % and all ranges, sub-ranges, and values therebetween, for example, about 69 mol %, 70 mol %, 71 mol %, 72 mol %, 73 mol %, 74 mol %, 75 mol %, 76 mol %, 77 mol %, or the like. The glass composition includes $Al_2O_3$ in a range of from about 0.1 mol % to about 0.5 mol % and all ranges, sub-ranges, and values therebetween, for example, 0.15 mol %, 0.2 mol %, 0.25 mol %, 0.3 mol %, 0.35 mol %, 0.4 mol %, 0.45 mol %, or the like. The glass composition includes $Na_2O$ in a range of from about 10 mol % to about 20 mol % and all ranges, sub-ranges, and values therebetween, for example, 11 mol %, 12 mol %, 13 mol %, 14 mol %, 15 mol %, 16 mol %, 17 mol %, 18 mol %, 19 mol %, or the like. The glass composition includes $K_2O$ in a range of from about 0.1 mol % to about 0.5 mol % and all ranges, sub-ranges, and values therebetween, for example, 0.15 mol %, 0.2 mol %, 0.25 mol %, 0.3 mol %, 0.35 mol %, 0.4 mol %, 0.45 mol %, or the like. The glass composition includes MgO in a range of from about 1 mol % to about 10 mol % and all ranges, sub-ranges, and values therebetween, for example, 2 mol %, 3 mol %, 4 mol %, 5 mol %, 6 mol %, 7 mol %, 8 mol %, 9 mol %, or the like. The glass composition includes CaO in a range of from about 5 mol % to about 15 mol % and all ranges, sub-ranges, and values therebetween, for example, 6 mol %, 7 mol %, 8 mol %, 9 mol %, 10 mol %, 11 mol %, 12 mol %, 13 mol %, 14 mol %, or the like. The glass composition may include $Fe_2O_3$ in a range of from about 0.05 mol % to about 0.6 mol % and all ranges, sub-ranges, and values therebetween, for example, 0.1 mol %, 0.15 mol %, 0.2 mol %, 0.25 mol %, 0.3 mol %, 0.35 mol %, 0.4 mol %, 0.45 mol %, 0.5 mol %, 0.55 mol % or the like. Further, the glass composition may include $TiO_2$ in a range of from about 0.01 mol % to about 0.25 mol % and all ranges, sub-ranges, and values therebetween, for example, 0.02 mol %, 0.03 mol %, 0.04 mol %, 0.05 mol %, 0.06 mol %, 0.07 mol %, 0.08 mol %, 0.09 mol %, or the like.

As stated above, the second glass article 120 comprises an aluminosilicate glass and includes $SiO_2$, $Al_2O_3$, $B_2O_3$, $Li_2O$, $Na_2O$, MgO, and $SnO_2$. Further, in some embodiments, the second glass article 120 may further include one or more of $P_2O_5$, $K_2O$, CaO, and SrO. In one or more embodiments, the glass composition of the second glass article 120 includes $SiO_2$ in an amount in a range from about 62 mol % to about 72 mol %, from about 64 mol % to about 72 mol %, from about 64 mol % to about 70 mol %, from about 64 mol % to about 68 mol %, from about 64 mol % to about 66 mol %, and all ranges, sub-ranges and values therebetween. For example, the glass composition includes $SiO_2$ in an amount of about 62 mol %, 62.25 mol %, 62.5 mol %, 62.75 mol %, 63 mol %, 63.1 mol %, 63.2 mol %, 63.3 mol %, 63.4 mol %, 63.5 mol %, 63.6 mol %, 63.7 mol %, 63.8 mol %, 63.9 mol %, 64 mol %, 64.1 mol %, 64.2 mol %, 64.3 mol %, 64.4 mol %, 64.5 mol %, 64.59 mol %, 64.6 mol %, 64.7 mol %, 64.71 mol %, 64.8 mol %, 64.82 mol %, 64.84 mol %, 64.9 mol %, 65 mol %, 65.1 mol %, 65.2 mol %, 65.3 mol %, 65.4 mol %, 65.5 mol %, 65.6 mol %, 65.6 mol %, 65.7 mol %, 65.8 mol %, 65.9 mol %, 66 mol %, 66.1 mol %, 66.2 mol %, 66.3 mol %, 66.4 mol %, 66.5 mol %, 66.6 mol %, 66.7 mol %, 66.8 mol %, 66.9 mol %, 67 mol %, 67.1 mol %, 67.2 mol %, 67.3 mol %, 67.4 mol %, 67.5 mol %, 67.6 mol %, 67.6 mol %, 67.7 mol %, 67.8 mol %, 67.9 mol %, 68 mol %, 68.1 mol %, 68.2 mol %, 68.3 mol %, 68.4 mol %, 68.5 mol %, 68.6 mol %, 68.6 mol %, 68.7 mol %, 68.8 mol %, 68.9 mol %, 69 mol %, 69.1 mol %, 69.2 mol %, 69.3 mol %, 69.4 mol %, 69.5 mol %, 69.6 mol %, 69.6 mol %, 69.7 mol %, 69.8 mol %, 69.9 mol %, 70 mol %, 70.1 mol %, 70.2 mol %, 70.3 mol %, 70.4 mol %, 70.5 mol %, 70.55 mol %, 70.6 mol %, 70.6 mol %, 70.7 mol %, 70.8 mol %, 70.9 mol %, 71 mol %, 71.1 mol %, 71.13 mol %, 71.2 mol %, 71.3 mol %, 71.4 mol %, 71.5 mol %, 71.6 mol %, 71.7 mol %, 71.8 mol %, 71.9 mol %, 72 mol %, and all ranges and sub-ranges therebetween.

In one or more embodiments, the glass composition of the second glass article 120 includes $Al_2O_3$ in an amount in a range from about 8 mol % to about 16 mol %, from about 8 mol % to about 14 mol %, from about 8 mol % to about 13 mol %, from about 8 mol % to about 12 mol %, from 10 mol % to about 14 mol %, from about 10 mol % to about 12 mol %, and all ranges, sub-ranges, and values therebetween. For example, the glass composition includes $Al_2O_3$ in an amount of about 8 mol %, 8.07 mol %, 8.1 mol %, 8.2 mol %, 8.24 mol % 8.3 mol %, 8.4 mol %, 8.5 mol %, 8.6 mol %, 8.7 mol %, 8.8 mol %, 8.9 mol %, 9 mol %, 9.1 mol %, 9.2 mol %, 9.3 mol %, 9.4 mol %, 9.5 mol %, 9.6 mol %, 9.7 mol %, 9.8 mol %, 9.9 mol %, 10 mol %, 10.1 mol %, 10.2 mol %, 10.3 mol %, 10.4 mol %, 10.5 mol %, 10.6 mol %, 10.7 mol %, 10.8 mol %, 10.9 mol %, 11 mol %, 11.1 mol %, 11.2 mol %, 11.3 mol %, 11.4 mol %, 11.5 mol %, 11.6 mol %, 11.7 mol %, 11.8 mol %, 11.9 mol %, 12 mol %, 12.01 mol %, 12.02 mol %, 12.1 mol %, 12.2 mol %, 12.3 mol %, 12.4 mol %, 12.5 mol %, 12.6 mol %, 12.7 mol %, 12.8 mol %, 12.9 mol %, 13 mol %, 13.1 mol %, 13.2 mol %, 13.3 mol %, 13.4 mol %, 13.5 mol %, 13.6 mol %, 13.7 mol %, 13.8 mol %, 13.9 mol %, 14 mol %, 14.1 mol %, 14.2 mol %, 14.3 mol %, 14.4 mol %, 14.5 mol %, 14.6 mol %, 14.7 mol %, 14.8 mol %, 14.9 mol %, 15 mol %, 15.1 mol %, 15.2 mol %, 15.3 mol %, 15.4 mol %, 15.5 mol %, 15.6 mol %, 15.7 mol %, 15.8 mol %, 15.9 mol %, 16 mol %, or the like.

In one or more embodiments, the glass composition of the second glass article 120 includes $B_2O_3$ in an amount in a range from about 6 mol % to about 10 mol %, from about 7 mol % to about 10 mol %, from about 8 mol % to about 10 mol %, from about 8 mol % to about 9 mol %, from 6 mol % to about 8 mol %, from about 6 mol % to about 9 mol %, and all ranges, sub-ranges, and values therebetween. For example, the glass composition includes $B_2O_3$ in an amount of about 6 mol %, 6.1 mol %, 6.2 mol %, 6.3 mol %, 6.4 mol %, 6.5 mol %, 6.6 mol %, 6.7 mol %, 6.8 mol %, 6.9 mol %, 7 mol %, 7.1 mol %, 7.2 mol %, 7.3 mol %, 7.4 mol %, 7.5 mol %, 7.6 mol %, 7.7 mol %, 7.8 mol %, 7.9 mol %, 8 mol %, 8.1 mol %, 8.11 mol %, 8.2 mol %, 8.3 mol %, 8.4 mol %, 8.44 mol %, 8.5 mol %, 8.57 mol %, 8.6 mol %, 8.64 mol %, 8.66 mol %, 8.7 mol %, 8.8 mol %, 8.9 mol %, 9 mol %, 9.1 mol %, 9.13 mol %, 9.2 mol %, 9.3 mol %, 9.4 mol %, 9.5 mol %, 9.6 mol %, 9.7 mol %, 9.8 mol %, 9.9 mol %, 10 mol %, or the like.

In one or more embodiments, the glass composition of the second glass article 120 includes $Li_2O$ in an amount in a range from about 3 mol % to about 8 mol %, from about 3 mol % to about 7 mol %, from about 3 mol % to about 6 mol %, from about 3 mol % to about 5 mol %, from 4 mol % to about 8 mol %, from about 5 mol % to about 8 mol %, and all ranges, sub-ranges, and values therebetween. For example, the glass composition includes $Li_2O$ in an amount of about 3 mol %, 3.1 mol %, 3.2 mol %, 3.3 mol %, 3.38 mol %, 3.4 mol %, 3.5 mol %, 3.6 mol %, 3.7 mol %, 3.8 mol %, 3.9 mol %, 4 mol %, 4.1 mol %, 4.2 mol %, 4.3 mol %, 4.4 mol %, 4.5 mol %, 4.53 mol %, 4.6 mol %, 4.7 mol %, 4.8 mol %, 4.84 mol %, 4.9 mol %, 4.92 mol %, 4.96 mol %, 5 mol %, 5.1 mol %, 5.2 mol %, 5.29 mol %, 5.3 mol %, 5.4 mol %, 5.5 mol %, 5.6 mol %, 5.7 mol %, 5.8 mol %, 5.9 mol %, 6 mol %, 6.1 mol %, 6.2 mol %, 6.3 mol %, 6.4 mol %, 6.5 mol %, 6.6 mol %, 6.7 mol %, 6.8 mol %, 6.9 mol %, 7 mol %, 7.1 mol %, 7.2 mol %, 7.3 mol %, 7.4 mol %, 7.5 mol %, 7.6 mol %, 7.7 mol %, 7.8 mol %, 7.9 mol %, 8 mol %, or the like.

In one or more embodiments, the glass composition of the second glass article 120 includes $Na_2O$ in an amount in a range from about 3 mol % to about 8 mol %, from about 4 mol % to about 8 mol %, from about 3.5 mol % to about 7.5 mol %, from about 4 mol % to about 7 mol %, from about 5 mol % to about 7 mol %, from about 3 mol % to about 7 mol %, from 3 mol % to about 6 mol %, from about 3.5 mol % to about 6.5 mol %, from about 3.5 mol % to about 5.5 mol %, and all ranges, sub-ranges, and values therebetween. For example, the glass composition includes $Na_2O$ in an amount of about 3 mol %, 3.1 mol %, 3.2 mol %, 3.3 mol %, 3.4 mol %, 3.5 mol %, 3.6 mol %, 3.7 mol %, 3.8 mol %, 3.9 mol %, 4 mol %, 4.1 mol %, 4.2 mol %, 4.3 mol %, 4.4 mol %, 4.5 mol %, 4.6 mol %, 4.7 mol %, 4.8 mol %, 4.9 mol %, 5 mol %, 5.1 mol %, 5.2 mol %, 5.3 mol %, 5.37 mol %, 5.4 mol %, 5.5 mol %, 5.6 mol %, 5.7 mol %, 5.8 mol %, 5.9 mol %, 6 mol %, 6.1 mol %, 6.19 mol %, 6.2 mol %, 6.29 mol %, 6.3 mol %, 6.4 mol %, 6.5 mol %, 6.6 mol %, 6.7 mol %, 6.8 mol %, 6.9 mol %, 7 mol %, 7.1 mol %, 7.2 mol %, 7.3 mol %, 7.4 mol %, 7.5 mol %, 7.6 mol %, 7.7 mol %, 7.8 mol %, 7.9 mol %, 8 mol %, or the like.

In one or more embodiments, the glass composition of the second glass article 120 includes MgO in an amount in a range from about 0 mol % to about 2 mol %, from about 1 mol % to about 1.5 mol %, from about 0 mol % to about 1.25 mol %, from about 0 mol % to about 1 mol %, from about 0 mol % to about 0.75 mol %, from about 0 mol % to about 0.5 mol %, from about 0 mol % to about 0.25 mol %, from about 0 mol % to about 0.2 mol %, from about 0 mol % to about 0.1 mol %, from about 0.01 mol % to about 1 mol %, from about 0.01 mol % to about 0.9 mol %, from about 0.01 mol % to about 0.75 mol %, from about 0.01 mol % to about 0.5 mol %, from 0.01 mol % to about 0.35 mol %, from about 0.01 mol % to about 0.25 mol %, from about 0.01 mol % to about 0.15 mol %, from about 0.01 mol % to about 0.1 mol %, from about 0.01 mol % to about 0.05 mol %, from about 0.01 mol % to about 0.02 mol %, and all ranges, sub-ranges, and values therebetween. For example, the glass composition includes MgO in an amount of about 0.01 mol %, 0.02 mol %, 0.03 mol %, 0.04 mol %, 0.05 mol %, 0.06 mol %, 0.07 mol %, 0.08 mol %, 0.09 mol %, 0.1 mol %, 0.11 mol %, 0.12 mol %, 0.13 mol %, 0.14 mol %, 0.15 mol %, 0.18 mol %, 0.2 mol %, 0.25 mol %, 0.3 mol %, 0.33 mol %, 0.35 mol %, 0.4 mol %, 0.42 mol %, 0.45 mol %, 0.5 mol %, 0.53 mol %, 0.55 mol %, 0.6 mol %, 0.63 mol %, 0.65 mol %, 0.7 mol %, 0.75 mol %, 0.8 mol %, 0.85 mol %, 0.9 mol %, 0.95 mol %, 1 mol %, or the like.

In one or more embodiments, the glass composition of the second glass article 120 includes $SnO_2$ in an amount in a range from about 0 mol % to about 0.25 mol %, from about 0.02 mol % to about 0.2 mol %, from about 0.04 mol % to about 0.15 mol %, from about 0.06 mol % to about 0.13 mol %, from about 0.06 mol % to about 0.09 mol %, and all ranges, sub-ranges, values therebetween. For example, the glass composition includes $SnO_2$ in an amount of about 0.01 mol %, 0.02 mol %, 0.03 mol %, 0.04 mol %, 0.05 mol %, 0.06 mol %, 0.07 mol %, 0.08 mol %, 0.09 mol %, 0.1 mol %, 0.11 mol %, 0.12 mol %, 0.13 mol %, 0.14 mol %, 0.15 mol %, 0.16 mol %, 0.17 mol %, 0.18 mol %, 0.19 mol %, 0.2 mol %, 0.21 mol %, 0.22 mol %, 0.23 mol %, 0.24 mol %, 0.25 mol % or the like.

In one or more embodiments, the glass composition of the second glass article 120 may include $P_2O_5$ in an amount in a range from about 0 mol % to about 3 mol %, from about 0 mol % to about 2 mol %, from about 0 mol % to about 1.8 mol %, from about 0 mol % to about 1.5 mol %, from about 0 mol % to about 1 mol %, from about 0 mol % to about 0.5 mol %, from about 0.5 mol % to about 2.5 mol %, from about 0.5 mol % to about 1.5 mol %, from about 1 mol % to about 3 mol %, from about 1.5 mol % to about 2.5 mol %, from about 1.8 mol % to about 2.5 mol %, from about 2 mol % to about 2.5 mol %, and all ranges, sub-ranges therebetween. For example, the glass composition includes $P_2O_5$ in an amount of about 0 mol %, 0.05 mol %, 0.1 mol %, 0.15 mol %, 0.2 mol %, 0.25 mol %, 0.3 mol %, 0.35 mol %, 0.4 mol %, 0.45 mol %, 0.5 mol %, 0.55 mol %, 0.6 mol %, 0.65 mol %, 0.7 mol %, 0.75 mol %, 0.8 mol %, 0.85 mol %, 0.9 mol %, 0.95 mol %, 1 mol %, 1.05 mol %, 1.1 mol %, 1.15 mol %, 1.2 mol %, 1.25 mol %, 1.3 mol %, 1.35 mol %, 1.4 mol %, 1.45 mol %, 1.5 mol %, 1.55 mol %, 1.6 mol %, 1.65 mol %, 1.7 mol %, 1.75 mol %, 1.79 mol %, 1.8 mol %, 1.85 mol %, 1.9 mol %, 1.95 mol %, 2 mol %, 2.05 mol %, 2.07 mol %, 2.09 mol %, 2.1 mol %, 2.15 mol %, 2.2 mol %, 2.25 mol %, 2.3 mol %, 2.35 mol %, 2.4 mol %, 2.45 mol %, 2.48 mol %, 2.49 mol %, 2.5 mol %, and all ranges and sub-ranges therebetween. Moreover, it should be understood that some embodiments have no $P_2O_5$, except for inevitable trace components.

In one or more embodiments, the glass composition of the second glass article 120 may include $K_2O$ in an amount in a range from about 0 mol % to about 1.5 mol %, from about 0 mol % to about 1.25 mol %, from about 0 mol % to about 1 mol %, from about 0 mol % to about 0.75 mol %, 0 mol % to about 0.5 mol %, from about 0 mol % to about 0.4 mol %, from about 0 mol % to about 0.2 mol %, from about 0 mol % to about 0.1 mol %, from about 0.1 mol % to about 1.25 mol %, from about 0.2 mol % to about 1.25 mol %, from about 0.4 mol % to about 1.25 mol %, from about 0.5 mol % to about 1.25 mol %, from about 0.75 mol % to about 1.25 mol %, from about 1 mol % to about 1.25 mol %, and all ranges, sub-ranges, and values therebetween. For example, the glass composition includes $K_2O$ in an amount of about 0 mol %, 0.05 mol %, 0.1 mol %, 0.15 mol %, 0.2 mol %, 0.25 mol %, 0.3 mol %, 0.35 mol %, 0.4 mol %, 0.45 mol %, 0.5 mol %, 0.55 mol %, 0.6 mol %, 0.65 mol %, 0.7 mol %, 0.75 mol %, 0.8 mol %, 0.85 mol %, 0.9 mol %, 0.95 mol %, 1 mol %, 1.05 mol %, 1.1 mol %, 1.12 mol %, 1.15 mol %, 1.2 mol %, 1.21 mol %, 1.22 mol %, 1.23 mol %, 1.25 mol %, and all ranges and sub-ranges therebetween.

Moreover, it should be understood that some embodiments have no $K_2O$, except for inevitable trace components.

In one or more embodiments, the glass composition of the second glass article 120 may include CaO in an amount in a range from about 0 mol % to about 1.5 mol %, from about 0 mol % to about 1 mol %, from about 0 mol % to about 0.75 mol %, 0 mol % to about 0.5 mol %, from about 0 mol % to about 0.3 mol %, from about 0 mol % to about 0.2 mol %, from about 0 mol % to about 0.1 mol %, and all ranges, sub-ranges, and values therebetween. For example, the glass composition includes CaO in an amount of about 0 mol %, 0.03 mol %, 0.05 mol %, 0.1 mol %, 0.15 mol %, 0.2 mol %, 0.25 mol %, 0.3 mol %, 0.35 mol %, 0.4 mol %, 0.45 mol %, 0.5 mol %, 0.55 mol %, 0.6 mol %, 0.65 mol %, 0.7 mol %, 0.75 mol %, 0.8 mol %, 0.85 mol %, 0.9 mol %, 0.95 mol %, 1 mol %, 1.05 mol %, 1.1 mol %, 1.15 mol %, 1.2 mol %, 1.25 mol %, 1.3 mol %, 1.35 mol %, 1.4 mol %, 1.45 mol %, 1.5 mol %, or the like. Moreover, it should be understood that some embodiments have no CaO, except for inevitable trace components.

In one or more embodiments, the glass composition of the second glass article 120 may include SrO in an amount in a range from about 0 mol % to about 1 mol %, from about 0 mol % to about 0.75 mol %, 0 mol % to about 0.5 mol %, from about 0 mol % to about 0.3 mol %, 0 mol % to about 0.25 mol %, from about 0 mol % to about 0.2 mol %, from about 0 mol % to about 0.1 mol %, and all ranges, sub-ranges, and values therebetween. For example, the glass composition includes SrO in an amount of about 0 mol %, 0.02 mol %, 0.05 mol %, 0.1 mol %, 0.15 mol %, 0.2 mol %, 0.25 mol %, 0.3 mol %, 0.35 mol %, 0.4 mol %, 0.45 mol %, 0.5 mol %, 0.55 mol %, 0.6 mol %, 0.65 mol %, 0.7 mol %, 0.75 mol %, 0.8 mol %, 0.85 mol %, 0.9 mol %, 0.95 mol %, 1 mol %, or the like. Moreover, it should be understood that some embodiments have no SrO, except for inevitable trace components.

In one or more embodiments, the glass composition of the second glass article 120 may include at least one alkali metal oxide selected from $Li_2O$, $Na_2O$ and $K_2O$, wherein the alkali metal oxide is present in an amount greater than about 5 mol %, greater than about 8 mol %, greater than about 10 mol %, greater than about 12 mol %, from about 5 mol % to about 20 mol %, from about 10 mol % to about 20 mol %, from about 10 mol % to about 15 mol %, and all ranges, sub-ranges, and values therebetween. In such embodiments, the glass composition or glass article formed therefrom may be characterized as an alkali aluminosilicate glass due to the presence of an alkali metal oxide. Further, in one or more embodiments, the amount of $Na_2O$ in the composition may be greater than the amount of $Li_2O$. In some instances, the amount of $Na_2O$ may be greater than the combined amount of $Li_2O$ and $K_2O$. Moreover, in one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In some embodiments, the glass composition of the second glass article 120 may include Fe expressed as $Fe_2O_3$, wherein Fe is present in an amount up to (and including) about 1.5 mol %. In some embodiments, the glass composition is substantially free of Fe. In one or more embodiments, the glass composition comprises Fe expressed as $Fe_2O_3$ in a range from about 0 mol % to about 1 mol %, from about 0 mol % to about 0.9 mol %, from about 0 mol % to about 0.8 mol %, from about 0 mol % to about 0.7 mol %, from about 0 mol % to about 0.6 mol %, from about 0 mol % to about 0.5 mol %, from about 0 mol % to about 0.4 mol %, from about 0 mol % to about 0.3 mol %, from about 0 mol % to about 0.2 mol %, 0 mol % to about 0.1 mol %, from about 0.01 mol % to about 0.9 mol %, from about 0.01 mol % to about 0.8 mol %, from about 0.01 mol % to about 0.7 mol %, from about 0.01 mol % to about 0.6 mol %, from about 0.01 mol % to about 0.5 mol %, from about 0.01 mol % to about 0.4 mol %, from about 0.01 mol % to about 0.3 mol %, from about 0.01 mol % to about 0.2 mol %, from about 0.05 mol % to about 0.1 mol %, from about 0.1 mol % to about 1 mol %, from about 0.2 mol % to about 1 mol %, from about 0.3 mol % to about 1 mol %, from about 0.4 mol % to about 1 mol %, from about 0.5 mol % to about 1 mol %, from about 0.6 mol % to about 1 mol %, from about 0.2 mol % to about 0.8 mol %, or from about 0.4 to about 0.8 mol % and all ranges, sub-ranges, and values therebetween. In one or more embodiments, the Fe source may be iron oxalate, $Fe_2O_3$.

While not intending to be limited by theory, β-OH is an optical measurement of the water content of the glass. In some embodiments, the glass composition of the second glass article 120 comprises β-OH in the range of 0.4 to about 0.8 mm$^{-1}$, from about 0.5 mm$^{-1}$ to about 0.8 mm$^{-1}$, from about 0.6 mm$^{-1}$ to about 0.8 mm$^{-1}$, or the like. For example, the glass composition of the second glass article 120 comprises β-OH in an amount of about 0.42 mm$^{-1}$, 0.44 mm$^{-1}$, 0.46 mm$^{-1}$, 0.48 mm$^{-1}$, 0.481 mm$^{-1}$, 0.5 mm$^{-1}$, 0.52 mm$^{-1}$, 0.54 mm$^{-1}$, 0.56 mm$^{-1}$, 0.58 mm$^{-1}$, mm$^{-1}$, 0.62 mm$^{-1}$, 0.64 mm$^{-1}$, 0.659 mm$^{-1}$, 0.66 mm$^{-1}$, 0.677 mm$^{-1}$, 0.68 mm$^{-1}$, 0.7 mm$^{-1}$, 0.72 mm$^{-1}$, 0.722 mm$^{-1}$, 0.74 mm$^{-1}$, 0.76 mm$^{-1}$, 0.78 mm$^{-1}$, or the like. In one example experiment, a Nicolet 670 infrared spectrometer was used to measure the optical transmission of a 0.5 mm to 1 mm thick polished sample of the second glass article 120 at wavelengths from 4000 cm$^{-1}$ through 400 cm$^{-1}$. β-OH was calculated using the equation: $\beta\text{-OH}=(1/thk)*\log(T_{Ref}/T_{OH})$, where thk is the sample thickness, $T_{Ref}$ is the transmittance of the sample at about 3846 cm$^{-1}$, and $T_{OH}$ is the transmittance of the sample at the OH transmission minimum around 3500 cm$^{-1}$, for example at 3550 cm$^{-1}$.

Furthermore, the first glass article 110 and the second glass article 120 may be further defined by a sag temperature, which is the temperature at which the log viscosity (in poise) of the glass article is 10 (e.g., the first glass article 110, the second glass article 120, or the like). Without intending to be limited by theory, the relationship between glass viscosity and temperature is calculated using the Vogel-Fulcher-Tamman (VFT) equation: $\log h = A+B/(T-T_o)$, where T is temperature, A, B and $T_o$ are fitting constants and h is the dynamic viscosity. Further, the temperature, the dynamic viscosity, and the fitting constants of the VFT equation may be determined using a bending beam viscosity (BBV) measurement method, a high temperature viscosity (HTV) measurement method, or a combination thereof [HTV+BBV]. Without intending to be limited by theory, HTV is measured over a viscosity range of approximately 1×10$^2$ to 1×10$^6$ poise according to ASTM C965. BBV is measured over a viscosity range of approximately 1×10$^{12}$ to 1×10$^{13.6}$ poise. The sag temperature is determined by fitting HTV data and BBV data near 1×10$^{12}$ poise to the VFT relationship and calculating the temperature at 1×10$^{10}$ poise.

Furthermore, in some embodiments, the first glass article 110 may comprise a sag temperature (measured using the HTV+BBV measurement method) of from about 620° C. to about 630° C. and all ranges, sub-ranges, and values therebetween, for example about 621° C., 622° C., 623° C., 624° C., 625° C., 625° C., 626° C., 627° C., 628° C., 629° C., or the like. Moreover, the second glass article 120 may comprise a sag temperature (measured using the HTV+BBV measurement method) of from about 635° C. to about 725° C., from about 640° C. to about 715° C., from about 640° C. to about 700° C., from about 640° C. to about 690° C., from about 650° C. to about 690° C., from about 650° C. to about 670° C., from about 650° C. to about 665° C., from about 660° C. to about 690° C., from about 670° C. to about 690° C., from about 660° C. to about 700° C., or the like, and all ranges, sub-ranges, and values therebetween, for example about 640° C., 645° C., 650° C., 655° C., 657° C., 658° C., 660° C., 662° C., 663° C., 664° C., 665° C., 666° C., 670° C., 675° C., 676° C., 680° C., 685° C., 686° C., 690° C., 691° C., 694° C. 695° C., 700° C., 705° C., 710° C., 715° C., 720° C., 721° C., or the like.

Further, the first glass article 110 comprises a 35 kilopoise (kP) temperature (i.e., the temperature at which the first glass article 110 comprises 35 kP), as measured by Fulcher fit to high temperature viscosity (HTV) data, of from about 930° C. to about 960° C. and all ranges, sub-ranges, and values therebetween, such as about 941° C., 942° C., 943° C., 944° C., 945° C., 946° C., 947° C., 948° C., 949° C., or the like. Further, the second glass article 120 comprises a 35 kP temperature of from about 1100° C. to about 1200° C., for example, from about 1120° C. to about 1190° C., from about 1120° C. to about 1180° C., from about 1120° C. to about 1170° C., from about 1125° C. to about 1170° C., from about 1125° C. to about 1165° C., from about 1120° C. to about 1160° C., from about 1120° C. to about 1150° C., from about 1120° C. to about 1140° C., from about 1120° C. to about 1130° C. and all ranges, sub-ranges, and values therebetween. For example, the 35 kP temperature of the second glass article 120 may about 1100° C. or greater, about 1110° C., or greater, about 1120° C. or greater, about 1130° C. or greater, about 1140° C. or greater, about 1150° C. or greater, about 1160° C. or greater, about 1170° C. or greater, about 1180° C. or greater, about 1190° C. or greater, or the like. Further, the 35 kP temperature of the second glass article 120 may comprise about 1120° C., about 1121° C., about 1122° C., about 1123° C., about 1124° C., about 1125° C., about 1126° C., about 1127° C., about 1128° C., about 1129° C., about 1130° C., about 1131° C., about 1132° C., about 1133° C., about 1134° C., about 1135° C., about 1136° C., about 1137° C., about 1138° C., about 1139° C., about 1140° C., about 1141° C., about 1142° C., about 1143° C., about 1144° C., about 1145° C., about 1146° C., about 1147° C., about 1148° C., about 1149° C., about 1150° C., about 1151° C., about 1152° C., about 1153° C., about 1154° C., about 1155° C., about 1156° C., about 1157° C., about 1158° C., about 1159° C., about 1160° C., about 1161° C., about 1162° C., about 1163° C., about 1164° C., about 1165° C., about 1166° C., about 1167° C., about 1168° C., about 1169° C., about 1170° C., about 1171° C., about 1172° C., about 1173° C., about 1174° C., about 1175° C., about 1176° C., about 1177° C., about 1178° C., about 1179° C., about 1180° C., about 1181° C., about 1182° C., about 1183° C., about 1184° C., about 1185° C., about 1186° C., about 1187° C., about 1188° C., about 1189° C., about 1190° C., about 1191° C., about 1192° C., about 1193° C., about 1194° C., about 1195° C., about 1196° C., about 1197° C., about 1197° C., about 1198° C., about 1199° C., or the like.

The first glass article 110 comprises a 100 kP temperature (i.e., the temperature at which the first glass article 110 comprises 100 kP), as measured by Fulcher fit to high throughput viscosity (HTV) data, which is from about 840° C. to about 910° C., for example, from about 850° C. to about 900° C., from about 860° C. to about 890° C., from about 870° C. to about 880° C., and all ranges, sub-ranges, and values therebetween, such as about 841° C., 842° C., 843° C., 844° C., 845° C., 846° C., 847° C., 848° C., 849° C., 850° C., 851° C., 852° C., 853° C., 854° C., 855° C., 856° C., 857° C., 858° C., 859° C., 860° C., 861° C., 862° C., 863° C., 864° C., 865° C., 866° C., 867° C., 868° C., 869° C., 870° C., 871° C., 872° C., 873° C., 874° C., 875° C., 876° C., 877° C., 878° C., 879° C., 880° C., 881° C., 882° C., 883° C., 884° C., 885° C., 886° C., 887° C., 888° C., 889° C., 890° C., 891° C., 892° C., 893° C., 894° C., 895° C., 896° C., 897° C., 898° C., 899° C., 900° C., 901° C., 902° C., 903° C., 904° C., 905° C., 906° C., 907° C., 908° C., 909° C., or the like. Further, the second glass article 120 comprises a 100 kP temperature of the second glass article 120 comprises from about 1050° C. to about 1140° C., for example, from about 1050° C. to about 1130° C., from about 1050° C. to about 1120° C., from about 1050° C. to about 1110° C., from about 1050° C. to about 1100° C., from about 1050° C. to about 1090° C., from about 1060° C. to about 1165° C., from about 1060° C. to about 1180° C., from about 1060° C. to about 1085° C., and all ranges, sub-ranges, and values therebetween. For example, the 100 kP temperature of the second glass article 120 may about 1050° C. or greater, about 1060° C., or greater, about 1070° C. or greater, about 1080° C. or greater, about 1090° C. or greater, or the like. Further, the 100 kP temperature of the second glass article 120 may comprise about 1050° C., about 1055° C., about 1060° C., about 1061° C., about 1062° C., about 1063° C., about 1064° C., about 1065° C., about 1066° C., about 1067° C., about 1068° C., about 1069° C., about 1070° C., about 1071° C., about 1072° C., about 1073° C., about 1074° C., about 1075° C., about 1076° C., about 1077° C., about 1078° C., about 1079° C., about 1080° C., about 1081° C., about 1084° C., about 1085° C., about 1090° C., about 1095° C., about 1100° C., about 1105° C., about 1110° C., about 1115° C., about 1120° C., about 1125° C., about 1129° C., about 1130° C., or the like.

The first glass article 110 comprises a 200 kP temperature (i.e., the temperature at which the first glass article 110 comprises 200 kP), as measured by Fulcher fit to high throughput viscosity (HTV) data, which is from about 860° C. to about 880° C. and all ranges, sub-ranges, and values therebetween, such as about 861° C., 862° C., 863° C., 864° C., 865° C., 866° C., 867° C., 868° C., 869° C., 870° C., 871° C., 872° C., 873° C., 874° C., 875° C., 876° C., 877° C., 878° C., 879° C., or the like. Further, the second glass article 120 comprises a 200 kP temperature of the second glass article 120 comprises from about 1010° C. to about 1100° C., for example, from about 1010° C. to about 1090° C., from about 1010° C. to about 1080° C., from about 1010° C. to about 1070° C., from about 1010° C. to about 1060° C., from about 1010° C. to about 1060° C., from about 1010° C. to about 1050° C., from about 1010° C. to about 1040° C., from about 1010° C. to about 1030° C., from about 1015° C. to about 1050° C., from about 1015° C. to about 1045° C., from about 1015° C. to about 1040° C., from about 1015° C. to about 1035° C., from about 1020° C. to about 1040° C., and all ranges, sub-ranges, and values therebetween. For example, the 200 kP temperature of the second glass article 120 may about 1010° C. or greater, about 1020° C., or greater, about 1030° C. or greater, about 1040° C. or greater, about 1050° C. or greater, or the like. Further, the 200 kP temperature of the second glass article 120 may comprise about 1010° C., about 1015° C., about 1019° C., about 1020° C., about 1021° C., about 1022° C., about 1023° C., about 1024° C., about 1025° C., about 1026° C., about 1027° C., about 1028° C., about 1029° C., about 1030° C., about 1031° C., about 1032° C., about 1033° C., about 1034° C., about 1035° C., about 1036° C., about 1037° C., about 1038° C., about 1039° C., about 1040° C., about 1041° C., about 1045° C., about 1050° C., about 1055° C., about 1060° C., about 1060° C., about 1065° C., about 1070° C., about 1075° C., about 1080° C., about 1085° C., about 1090° C., about 1091° C., 1095° C. or the like.

The first glass article 110 comprises a liquidus temperature (i.e., the lowest temperature at which the first glass article 110 is completely liquid) of from about 990° C. to about 1030° C., for example, from about 1000° C. to about 1020° C., from about 1005° C. to about 1015° C., and all ranges, sub-ranges, and values therebetween, such as about 991° C., 992° C., 993° C., 994° C., 995° C., 996° C., 997° C., 998° C., 1000° C., 1001° C., 1002° C., 1003° C., 1004° C., 1005° C., 1006° C., 1007° C., 1008° C., 1009° C., 1010° C., 1011° C., 1012° C., 1013° C., 1014° C., 1015° C., 1016° C., 1017° C., 1018° C., 1019° C., 1020° C., 1021° C., 1022° C., 1023° C., 1024° C., 1025° C., 1026° C., 1027° C., 1028° C., 1029° C., or the like. Further, the second glass article 120 comprises a liquidus temperature of from about 825° C. to about 1150° C., for example, from about 825° C. to about 1050° C., from about 825° C. to about 950° C., from about 900° C. to about 1100° C., from about 900° C. to about 1000° C., or the like, such as 830° C., 835° C., 840° C., 845° C., 850° C., 855° C., 860° C., 865° C., 870° C., 875° C., 880° C., 885° C., 890° C., 895° C., 900° C., 905° C., 910° C., 915° C., 920° C., 925° C., 930° C., 935° C., 940° C., 945° C., 950° C., 955° C., 960° C., 965° C., 970° C., 975° C., 980° C., 985° C., 990° C., 995° C., 1000° C., 1005° C., 1010° C., 1015° C., 1020° C., 1025° C., 1030° C., 1035° C., 1040° C., 1045° C., 1050° C., 1055° C., 1060° C., 1065° C., 1070° C., 1075° C., 1080° C., 1085° C., 1090° C., 1095° C., 1100° C., 1105° C., 1110° C., 1115° C., 1120° C., 1125° C., 1130° C., 1135° C., 1140° C., 1145° C., or the like.

In some embodiments, the first glass article 110 comprises a viscosity at the liquidus temperature of from about 10 kP to about 20 kP, for example, about 11 kP, 12 kP, 13 kP, 14 kP, 15 kP, 16 kP, 17 kP, 18 kP, 19 kP, or the like. Further, the second glass article 120 comprises a viscosity at the liquidus temperature of from about 30 kP to about 10000 kP, for example, from about 50 kP to about 10000 kP, from about 100 kP to about 10000 kP, from about 250 kP to about 10000 kP, from about 250 kP to about 9000 kP, from about 250 kP to about 7500 kP, from about 250 kP to about 5000 kP, from about 250 kP to about 3000 kP, from about 250 kP to about 2500 kP, from about 250 kP to about 2000 kP, from about 250 kP to about 1000 kP, from about 500 kP to about 2000 kP, or the like. In some embodiments, the second glass article 120 comprises a viscosity at the liquidus temperature of about 50 kP or greater, 100 kP or greater, 200 kP or greater, 300 kP or greater, 400 kP or greater, 500 kP or greater, 600 kP or greater, 750 kP or greater, 1000 kP or greater, 2000 kP or greater, or the like. For example, the second glass article 120 may comprise a viscosity at the liquidus temperature of about 40 kP, 50 kP, 53 kP, 55 kP, 60 kP, 75 kP, 90 kP, 96 kP, 100 kP, 125 kP, 145 kP, 150 kP, 200 kP, 250 kP, 279 kP, 300 kP, 336 kP, 350 kP, 385 kP, 400 kP, 422 kP, 450 kP, 500 kP, 550 kP, 600 kP, 750 kP, 800 kP, 850 kP, 892 kP, 900 kP, 1000 kP, 1250 kP, 1500 kP, 1750 kP, 1900 kP, 1924 kP, 1926 kP, 2000 kP, 2250 kP, 2312 kP, 2500 kP, 3000 kP, 3500 kP, 4000 kP, 4250 kP, 4500 kP, 4750 kP, 5000 kP, 5250 kP, 5500 kP, 5750 kP, 6000 kP, 6250 kP, 6500 kP, 6750 kP, 7000 kP, 7250 kP, 7500 kP, 7750 kP, 8000 kP, 8250 kP, 8500 kP, 8750 kP, 8965 kP, 9000 kP, 9041 kP, 9250 kP, 9500 kP, 9750 kP, 10000 kP, or the like.

In one or more embodiments, the first glass article 110 comprises a viscosity at 600° C. of from about $6 \times 10^{10}$ poises to about $1 \times 10^{11}$ poises and all ranges, subranges, and values therebetween, for example, about $6.1 \times 10^{10}$ poises, $6.2 \times 10^{10}$ poises, $6.3 \times 10^{10}$ poises, $6.5 \times 10^{10}$ poises, $6.55 \times 10^{10}$ poises, $6.57 \times 10^{10}$ poises, $6.6 \times 10^{10}$ poises, $6.7 \times 10^{10}$ poises, $6.8 \times 10^{10}$ poises, $6.9 \times 10^{10}$ poises, or the like. The first glass article 110 comprises a log viscosity at 600° C. of from about 10 to about 11 and all ranges, sub-ranges, and values therebetween, for example, about 10.1, 10.2, 10.3, 10.4, 10.5, 10.6, 10.7, 10.8, 10.82, 10.85, 10.9, or the like.

In one or more embodiments, the second glass article 120 comprises a viscosity at 600° C. of from about $9 \times 10^{10}$ poises to about $3 \times 10^{12}$ poises and all ranges, sub-ranges, and values therebetween, such as, about $9 \times 10^{10}$ poises to about $1.5 \times 10^{12}$ poises, about $9 \times 10^{10}$ poises to about $9 \times 10^{11}$ poises, about $9 \times 10^{10}$ poises to about $5 \times 10^{11}$ poises, about $9 \times 10^{10}$ poises to about $3 \times 10^{11}$ poises, about $9 \times 10^{10}$ poises to about $2 \times 10^{11}$ poises, and all ranges and subranges therebetween, for example, about $9.25 \times 10^{10}$ poises, about $9.5 \times 10^{10}$ poises, about $9.75 \times 10^{10}$ poises, about $1 \times 10^{11}$ poises, about $1.2 \times 10^{11}$ poises, about $1.25 \times 10^{11}$ poises, about $1.43 \times 10^{11}$ poises, about $1.5 \times 10^{11}$ poises, about $1.75 \times 10^{11}$ poises, about $1.92 \times 10^{11}$ poises, about $2 \times 10^{11}$ poises, about $2.5 \times 10^{11}$ poises, about $2.85 \times 10^{11}$ poises, about $3 \times 10^{11}$ poises, about $3.5 \times 10^{11}$ poises, about $4 \times 10^{11}$ poises, about $4.5 \times 10^{11}$ poises, about $4.69 \times 10^{11}$ poises, about $5 \times 10^{11}$ poises, about $5.5 \times 10^{11}$ poises, about $6 \times 10^{11}$ poises, about $6.5 \times 10^{11}$ poises, about $7 \times 10^{11}$ poises, about $7.5 \times 10^{11}$ poises, about $7.86 \times 10^{11}$ poises, about $8 \times 10^{11}$ poises, about $8.5 \times 10^{11}$ poises, about $9 \times 10^{11}$ poises, about $9.5 \times 10^{11}$ poises, about $1 \times 10^{12}$ poises, about $1.25 \times 10^{12}$ poises, about $1.32 \times 10^{12}$ poises, about $1.5 \times 10^{12}$ poises, about $1.75 \times 10^{12}$ poises, about $2 \times 10^{12}$ poises, about $2.1 \times 10^{12}$ poises, about $2.25 \times 10^{12}$ poises, about $2.5 \times 10^{12}$ poises, about $2.75 \times 10^{12}$ poises, or the like.

As used herein, a viscosity ratio is a ratio of the viscosity of the first glass article 110 ($V_1$) and the viscosity of the second glass article 120 ($V_2$), which may be mathematically described as $V_2/V_1$. Further, the viscosity ratio may be measured at various temperatures. The viscosity ratio at 600° C. may be from about 1 to about 500, for example, from about 1 to about 250, from about 1 to about 200, from about 1 to about 150, from about 1 to about 100, from about 1 to about 50, from about 1 to about 40, from about 1 to about 35, from about 1 to about 30, from about 1 to about 25, from about 1 to about 20, from about 1 to about 15, from about 1 to about 10, from about 1 to about 9, from about 1 to about 8, from about 1 to about 7, from about 1 to about 6, from about 1 to about 5, from about 1 to about 4, from about 1 to about 3, from about 1 to about 2, or the like.

The second glass article 120 comprises a log viscosity at 600° C. of from about 10.5 to about 12.5, from about 10.5 to about 12, from about 10.5 to about 11.5, from about 10.5 to about 11, and all ranges, sub-ranges, and values therebetween, for example, about 10.6, 10.63, 10.7, 10.74, 10.8, 10.9, 10.92, 11, 11.1, 11.2, 11.3, 11.4, 11.45, 11.5, 11.6, 11.67, 11.7, 11.8, 11.9, 12, 12.1, 12.12 12.2, 12.3, 12.32, 12.4, or the like. Further, as used herein, a log viscosity ratio is a ratio of the log viscosity of the first glass article 110 (log $V_1$) and the log viscosity of the second glass article 120 (log $V_2$), which may be mathematically described as log $V_2$/log $V_1$. Further, the log viscosity ratio may be measured at various temperatures. The log viscosity ratio at 600° C. may be from about 1 to about 3, from about 1 to about 2.5, from about 1 to about 2, from about 1 to about 1.5, from about 1 to about 1.4, from about 1 to about 1.3, from about 1 to about 1.2, from about 1 to about 1.1, or the like.

In one or more embodiments, the first glass article 110 comprises a viscosity at 615° C. of from about $1.5 \times 10^{10}$ poises to about $3 \times 10^{10}$ poises and all ranges, sub-ranges, and values therebetween, for example, about $1.6 \times 10^{10}$ poises, $1.7 \times 10^{10}$ poises, $1.8 \times 10^{10}$ poises, $1.9 \times 10^{10}$ poises, $1.95 \times 10^{10}$ poises, $1.97 \times 10^{10}$ poises, $2 \times 10^{10}$ poises, $2.1 \times 10^{10}$ poises, $2.2 \times 10^{10}$ poises, $2.3 \times 10^{10}$ poises, $2.4 \times 10^{10}$ poises, $2.5 \times 10^{10}$ poises, $2.6 \times 10^{10}$ poises, $2.7 \times 10^{10}$ poises, $2.8 \times 10^{10}$ poises, $2.9 \times 10^{10}$ poises, or the like. The first glass article 110 comprises a log viscosity at 615° C. of from about 10 to about 11 and all ranges, sub-ranges, and values therebetween, for example, about 10.1, 10.2, 10.29, 10.3, 10.4, 10.5, 10.6, 10.7, 10.8, 10.85, 10.9, or the like.

In one or more embodiments, the second glass article 120 comprises a viscosity at 615° C. of from about $4 \times 10^{10}$ poises to about $8 \times 10^{12}$ poises, such as, about $4 \times 10^{10}$ poises to about $6 \times 10^{12}$ poises, about $4 \times 10^{10}$ poises to about $3.5 \times 10^{12}$ poises, about $4 \times 10^{10}$ poises to about $1.5 \times 10^{11}$ poises, about $4 \times 10^{10}$ poises to about $5 \times 10^{11}$ poises, about $4 \times 10^{10}$ poises to about $2 \times 10^{11}$ poises, about $4 \times 10^{10}$ poises to about $1 \times 10^{11}$ poises, about $4 \times 10^{10}$ poises to about $9 \times 10^{10}$ poises, about $4 \times 10^{10}$ poises to about $6.5 \times 10^{12}$ poises, and all ranges, sub-ranges, and values therebetween, for example, about $4.22 \times 10^{10}$ poises, about $4.5 \times 10^{10}$ poises, about $5 \times 10^{10}$ poises, about $5.42 \times 10^{10}$ poises, about $5.5 \times 10^{10}$ poises, about $6 \times 10^{10}$ poises, about $6.29 \times 10^{10}$ poises, about $6.35 \times 10^{10}$ poises, about $6.5 \times 10^{10}$ poises, about $7 \times 10^{10}$ poises, about $7.5 \times 10^{10}$ poises, about $8 \times 10^{10}$ poises, about $8.25 \times 10^{10}$ poises, about $8.35 \times 10^{10}$ poises, about $8.5 \times 10^{10}$ poises, about $9 \times 10^{10}$ poises, about $9.5 \times 10^{10}$ poises, about $1 \times 10^{11}$ poises, about $1.23 \times 10^{11}$ poises, about $1.5 \times 10^{11}$ poises, about $1.92 \times 10^{11}$ poises, about $2 \times 10^{11}$ poises, about $2.04 \times 10^{11}$ poises, about $2.5 \times 10^{11}$ poises, about $3 \times 10^{11}$ poises, about $3.17 \times 10^{11}$ poises, about $3.5 \times 10^{11}$ poises, about $3.79 \times 10^{11}$ poises, about $4 \times 10^{11}$ poises, about $4.5 \times 10^{11}$ poises, about $5 \times 10^{11}$ poises, about $5.5 \times 10^{11}$ poises, about $6 \times 10^{11}$ poises, about $6.5 \times 10^{11}$ poises, about $7.5 \times 10^{11}$ poises, about $8 \times 10^{11}$ poises, about $8.5 \times 10^{11}$ poises, about $9 \times 10^{11}$ poises, about $9.5 \times 10^{11}$ poises, about $1 \times 10^{12}$ poises, about $1.24 \times 10^{12}$ poises, $1.5 \times 10^{12}$ poises, about $2 \times 10^{12}$ poises, $2.5 \times 10^{12}$ poises, about $3 \times 10^{12}$ poises, $3.04 \times 10^{12}$ poises, about $3.5 \times 10^{12}$ poises, $4 \times 10^{12}$ poises, about $4.5 \times 10^{12}$ poises, about $5 \times 10^{12}$ poises, about $5.07 \times 10^{12}$ poises, about $5.5 \times 10^{12}$ poises, about $5.55 \times 10^{12}$ poises, about $6 \times 10^{12}$ poises, about $6.5 \times 10^{12}$ poises, about $7 \times 10^{12}$ poises, about $7.5 \times 10^{12}$ poises, or the like.

In some embodiments, the viscosity ratio at 615° C. may be from about 1 to about 450, for example, from about 1 to about 250, from about 1 to about 200, from about 1 to about 150, from about 1 to about 100, from about 1 to about 50, from about 1 to about 40, from about 1 to about 35, from about 1 to about 30, from about 1 to about 25, from about 1 to about 20, from about 1 to about 15, from about 1 to about 10, from about 1 to about 9, from about 1 to about 8, from about 1 to about 7, from about 1 to about 6, from about 1 to about 5, from about 1 to about 4, from about 1 to about 3, from about 1 to about 2.5, or the like.

The second glass article 120 comprises a log viscosity at 615° C. of from about 10.5 to about 12.5, from about 10.5 to about 12, from about 10.5 to about 11.5, from about 10.5 to about 11, and all ranges, sub-ranges, and values therebetween, for example, about 10.6, 10.63, 10.7, 10.74, 10.8, 10.9, 10.92, 11, 11.09, 11.1, 11.2, 11.28, 11.3, 11.31, 11.4, 11.5, 11.58, 11.6, 11.67, 11.7, 11.71, 11.74, 11.8, 11.88, 11.9, 12, 12.09, 12.1, 12.12 12.2, 12.3, 12.32, 12.4, 12.45, 12.48, or the like. Further, the log viscosity ratio at 615° C. may be from about from about 1 to about 3, from about 1 to about 2.5, from about 1 to about 2, from about 1 to about 1.5, from about 1 to about 1.4, from about 1 to about 1.3, from about 1 to about 1.2, from about 1 to about 1.1, or the like.

In one or more embodiments, the first glass article 110 comprises a viscosity at 630° C. of from about $5.5 \times 10^{9}$ poises to about $7.5 \times 10^{9}$ poises and all ranges, sub-ranges, and values therebetween, for example, about $5.6 \times 10^{9}$ poises, $5.7 \times 10^{9}$ poises, $5.8 \times 10^{9}$ poises, $5.9 \times 10^{9}$ poises, $6.0 \times 10^{9}$ poises, $6.1 \times 10^{9}$ poises, $6.2 \times 10^{9}$ poises, $6.3 \times 10^{9}$ poises, $6.4 \times 10^{9}$ poises, $6.5 \times 10^{9}$ poises, $6.6 \times 10^{9}$ poises, $6.7 \times 10^{9}$ poises, $6.8 \times 10^{9}$ poises, $6.9 \times 10^{9}$ poises, $7.0 \times 10^{9}$ poises, $7.1 \times 10^{9}$ poises, $7.2 \times 10^{9}$ poises, $7.3 \times 10^{9}$ poises, $7.4 \times 10^{9}$ poises or the like. Further, the first glass article 110 comprises a log viscosity at 630° C. of from about 9.5 to about 10.5 and all ranges, sub-ranges, and values therebetween, for example, about 9.55, 9.6, 9.65, 9.7, 9.75, 9.8, 9.81, 9.85, 9.9, 9.95, 10, 10.05, 10.1, 10.15, 10.2, 10.25, 10.3, 10.35, 10.4, 10.45, or the like.

In one or more embodiments, the second glass article 120 comprises a viscosity at 630° C. of from about $1.5 \times 10^{10}$ poises to about $3 \times 10^{12}$ poises, such as, from about $1.5 \times 10^{10}$ poises to about $3 \times 10^{11}$ poises, from about $1.5 \times 10^{10}$ poises to about $2 \times 10^{11}$ poises, from about $1.5 \times 10^{10}$ poises to about $1 \times 10^{11}$ poises, from about $1.5 \times 10^{10}$ poises to about $9 \times 10^{10}$ poises, from about $1.5 \times 10^{10}$ poises to about $3 \times 10^{10}$ poises, from about $1.5 \times 10^{10}$ poises to about $4 \times 10^{10}$ poises from about $1.5 \times 10^{10}$ poises to about $3 \times 10^{10}$ poises, or the like, from about $2 \times 10^{10}$ poises to about $4 \times 10^{10}$ poises, from about $2 \times 10^{10}$ poises to about $3 \times 10^{10}$ poises, from about $2.5 \times 10^{10}$ poises to about $4 \times 10^{10}$ poises, from about $2.5 \times 10^{10}$ poises to about $3.5 \times 10^{10}$ poises, And all ranges, sub-ranges, and values therebetween, for example, about $1.75 \times 10^{10}$ poises, about $2 \times 10^{10}$ poises, about $2.1 \times 10^{10}$ poises, about $2.2 \times 10^{10}$ poises, about $2.3 \times 10^{10}$ poises, about $2.4 \times 10^{10}$ poises, about $2.5 \times 10^{10}$ poises, about $2.6 \times 10^{10}$ poises, about $2.7 \times 10^{10}$ poises, about $2.8 \times 10^{10}$ poises, about $2.9 \times 10^{10}$ poises, about $3 \times 10^{10}$ poises, about $3.1 \times 10^{10}$ poises, about $3.2 \times 10^{10}$ poises, about $3.3 \times 10^{10}$ poises, about $3.4 \times 10^{10}$ poises, about $3.5 \times 10^{10}$ poises, $3.6 \times 10^{10}$ poises, $3.7 \times 10^{10}$ poises, $3.8 \times 10^{10}$ poises, $3.9 \times 10^{10}$ poises, $4 \times 10^{10}$ poises, $4.25 \times 10^{10}$ poises, $4.5 \times 10^{10}$ poises, $4.75 \times 10^{10}$ poises, $5 \times 10^{10}$ poises, $5.25 \times 10^{10}$ poises $5.5 \times 10^{10}$ poises, $5.75 \times 10^{10}$ poises, $6 \times 10^{10}$ poises, $7 \times 10^{10}$ poises, $8 \times 10^{10}$ poises, $9 \times 10^{10}$ poises, $1 \times 10^{11}$ poises, $2 \times 10^{11}$ poises, $3 \times 10^{11}$ poises, $4 \times 10^{11}$ poises, $5 \times 10^{11}$ poises, $6 \times 10^{11}$ poises, $7 \times 10^{11}$ poises, $8 \times 10^{11}$ poises, $9 \times 10^{11}$ poises, $1 \times 10^{12}$ poises, $2 \times 10^{12}$ poises, $3 \times 10^{12}$ poises, or the like.

In some embodiments, the viscosity ratio at 630° C. may be from about 1 to about 425, for example, from about 1 to about 250, from about 1 to about 175, from about 1 to about 100, from about 1 to about 50, from about 1 to about 40, from about 1 to about 35, from about 1 to about 30, from about 1 to about 25, from about 1 to about 20, from about 1 to about 15, from about 1 to about 10, from about 1 to about 9, from about 1 to about 8, from about 1 to about 7, from about 1 to about 6, from about 1 to about 5, from about 1 to about 4, from about 2 to about 10, from about 2 to about 6, from about 2 to about 5, from about 3 to about 6 or the like.

Furthermore, the second glass article 120 comprises a log viscosity at 630° C. of from about 10 to about 12.5, from about 10 to about 12, from about 10 to about 11.5, from about 10 to about 11, from about 10 to 10.75, from about 10 to 10.5, and all ranges, sub-ranges, and values therebetween, for example, about 10.1, 10.2, 10.3, 10.4, 10.41, 10.45, 10.46, 10.47, 10.5, 10.55, 10.58, 10.6, 10.75, 10.9, 10.92, 10.96, 11, 11.1, 11.13, 11.19, 11.3, 11.31, 11.33, 11.4, 11.45, 11.5, 11.75, 12, 12.01, 12.25, 12.42, or the like. Further, the viscosity ratio at 630° C. may be from about from about 1 to about 2, from about 1 to about 1.5, from about 1 to about 1.4, from about 1 to about 1.3, from about 1 to about 1.25, from about 1 to about 1.2, from about 1 to about 1.15, from about 1 to about 1.13, from about 1 to about 1.1, from about 1 to about 1.09, from about 1 to about 1.075, or the like.

In some embodiments, the first glass article 110 comprises d(log viscosity)/dT at 100 kP of from about −0.01 to about −0.02 and all ranges, sub-ranges, and values therebetween, for example, about −0.0105, −0.011, −0.0115, −0.012, −0.0125, −0.013, −0.0135, −0.014, −0.0145, −0.015, −0.0155, −0.016, −0.0165, −0.017, −0.0175, −0.018, −0.0185, −0.019, −0.0195, or the like. In some embodiments, the second glass article 120 comprises d(log viscosity)/dT at 100 kP of from about −0.006 to about −0.009 and all ranges, sub-ranges, and values therebetween, for example, about −0.0064, −0.0065, −0.0069, −0.007, −0.0071, −0.0072–0.0075, −0.0077, −0.0079, −0.008, −0.0084, −0.0085, 0.0086, or the like.

In one or more embodiments, the first glass article 110 and/or the second glass article 120 may be strengthened, for example, chemically, mechanically and/or thermally. In some embodiments, the first glass article 110 may be strengthened in the same or in a different manner than the second glass article 120. In some embodiments, the first glass article 110 and/or the second glass article 120 may be strengthened mechanically by utilizing a mismatch of the coefficient of thermal expansion between portions of the article to create a compressive stress region and a central region exhibiting a tensile stress. In some embodiments, the glass article may be strengthened thermally by heating the glass to a temperature below the glass transition point and then rapidly quenching. Further, in some embodiments, the glass article may be chemically strengthening by ion exchange. In the ion exchange process, ions at or near the surface of the glass article are replaced by—or exchanged with—larger ions having the same valence or oxidation state. In those embodiments in which the glass article comprises an alkali aluminosilicate glass, ions in the surface layer of the article and the larger ions are monovalent alkali metal cations, such as $Li^+$, $Na^+$, $K^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass article generate a stress.

Figure 5:
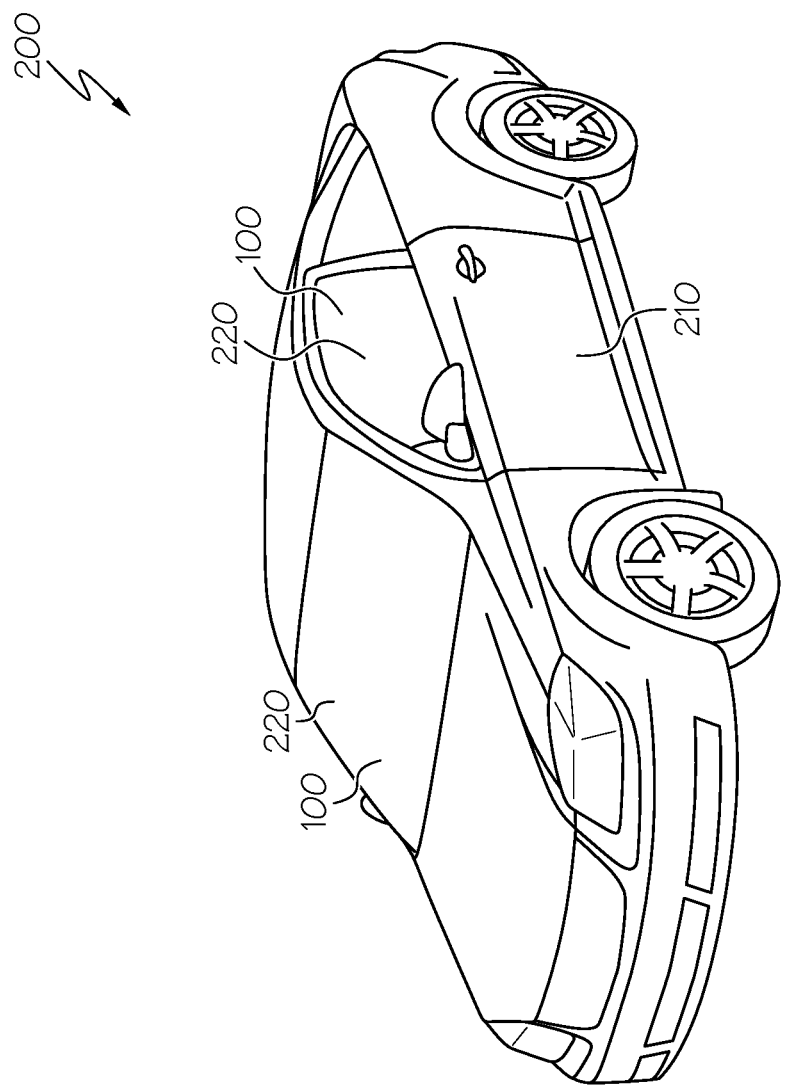
FIG. 5 is an illustration of a vehicle that includes a laminate having a first glass article, a second glass article and an interlayer positioned therebetween, according to one or more embodiments shown and described herein.

Referring now to FIG. 5, the laminates 100 described herein may be a component of a vehicle 200. The vehicle 200 comprises a body 210 defining an interior, at least one opening 220 in communication with the interior, and a window disposed in the opening, wherein the window comprises the laminate 100, described above. In some embodiments, the second glass article 120 of the laminate 100 faces the interior of the vehicle and the first glass article 110 faces the exterior of the vehicle. For example, the laminate 100 may be used as the sidelights, windshields, rear windows, windows, rearview mirrors, and sunroofs of the vehicle 200. As additional examples, the laminate 100 may form an interior partition (not shown) within the interior of the vehicle 200 or may be disposed on an exterior surface of the vehicle 200 and form an engine block cover, headlight cover, taillight cover, or pillar cover. Further, the vehicle 200 may include an interior surface (not shown, but may include door trim, seat backs, door panels, dashboards, center consoles, floorboards, and pillars), and the laminate 100 described herein may be disposed on the interior surface. The vehicle 200 may include be an automobile, rolling stock, locomotive, boat, ship, airplane, helicopter, drone, space craft, or the like. In other embodiments, the laminates 100 described herein may be used in an architectural application, for example, balustrades, stairs, decorative panels or covering for walls, acoustic panels or coverings, columns, partitions, elevator cabs, household appliances, windows, furniture, and other applications, formed at least partially using a laminate or glass article according to one or more embodiments.

EXAMPLES

Various embodiments will be further clarified by the following examples.

Example 1

Example 1 is an example glass composition of soda-lime glass, according to one or more embodiments of this disclosure. The glass compositions (in mol %) of Example 1 are provided in Table 1, along with strain point temperature, annealing point temperature, softening point temperature, density, CTE, temperature at a viscosity of 35 kilopoise (kP), temperature at a viscosity of 100 kP, temperature at a viscosity of 200 kP, among other properties. In some embodiments, the example soda-lime glass of example 1 may comprise the first glass article 110 described herein.

TABLE 1

| Example | 1 |
|---|---|
| $SiO_2$ | 72 |
| $Al_2O_3$ | 0.1 |
| $Na_2O$ | 12.8 |
| MgO | 4.6 |
| CaO | 10 |
| $Fe_2O_3$ | 0.2 |
| $TiO_2$ | 0.2 |
| Strain Point (° C.) | 496 |
| Annealing Point (° C.) | 538 |
| Softening Point (° C.) | 721 |
| Density (g/cm$^3$) | 2.507 |
| Coefficient of Thermal Expansion × $10^{-7}$ (1/° C.) | 85.3 |
| Soft-Anneal (BBV) | 183 |
| A (HTV) | −1.835 |
| B (HTV) | 4470.4 |
| $T_0$ (HTV) | 243.1 |
| A (HTV + BBV) | −1.769 |
| B (HTV + BBV) | 4356.7 |
| $T_0$ (HTV + BBV) | 253.9 |
| 35 kP Temperature (° C.) | 944 |
| 100 kP Temperature (° C.) | 897 |
| 200 kP Temperature (° C.) | 870 |
| Liquidus Temperature (° C.) | 1010 |
| Viscosity @ Liquidus Temperature (kP) | 16 |
| [Annealing Point (° C.) + Softening Point (° C.)]/2 | 630 |
| Viscosity @ 600° C. | 6.59 E+10 |
| Log viscosity @ 600° C. | 10.82 |
| Viscosity @ 615° C. | 1.98 E+10 |
| Log viscosity @ 615° C. | 10.3 |
| Viscosity @ 630° C. | 6.53 E+9 |
| Log viscosity @ 630° C. | 9.81 |
| d(log visc.)/dT @ 100 kP | −0.0105 |

Examples 2-17

Examples 2-17 are example glass compositions of aluminosilicate glass, according to one or more embodiments of the disclosure. The glass compositions (in mol %) of Examples 2-17 are provided in Table 2. along with strain point temperature, annealing point temperature, softening point temperature, density, CTE, temperature at a viscosity of 35 kilopoise (kP), temperature at a viscosity of 100 kP, temperature at a viscosity of 200 kP, among other properties. Table 2 also includes the viscosity ratios between example 1 (i.e., the soda lime glass of Table 1) and each of the glass composition examples 2-17 and log viscosity ratios between example 1 (i.e., the soda lime glass of Table 1) and each of the glass composition example 2-17. Furthermore, in some embodiments, the example aluminosilicate glasses of examples 2-17 may comprise the second glass article 120 described herein.

TABLE 2

| Example | 2 | 3 | 4 | 5 | 6 |
|---|---|---|---|---|---|
| $SiO_2$ | 63.6 | 63.8 | 63.9 | 64.2 | 64.6 |
| $Al_2O_3$ | 15.1 | 14.8 | 14.5 | 14.0 | 13.9 |
| $B_2O_3$ | 6.4 | 6.4 | 6.6 | 6.9 | 6.9 |
| $P_2O_5$ | 0.00 | 0.00 | 0.00 | 0.00 | 0 |
| $Li_2O$ | 7.4 | 7.3 | 6.9 | 6.7 | 6.4 |
| $Na_2O$ | 3.9 | 4.8 | 6.4 | 6.9 | 6.7 |
| $K_2O$ | 0.0 | 0.1 | 0.2 | 0.4 | 0.4 |
| MgO | 1.0 | 1.0 | 0.9 | 0.8 | 0.8 |
| CaO | 1.5 | 1.0 | 0.3 | 0.0 | 0 |
| SrO | 1.0 | 0.7 | 0.2 | 0.0 | 0 |
| $SnO_2$ | 0.04 | 0.06 | 0.04 | 0.04 | 0.06 |
| β-OH ($mm^{-1}$) | 0.481 | — | — | — | — |
| Strain Point (° C.) | 557 | 541 | 519 | 516 | 512 |
| Annealing Point (° C.) | 606 | 591 | 573 | 569 | 566 |
| Softening Point (° C.) | 841 | 836 | 822 | 821 | 824 |
| Density (g/$cm^3$) | 2.396 | 2.382 | 2.363 | 2.355 | 2.353 |
| Coefficient of Thermal Expansion × $10^{-7}$ (1/° C.) | 54.8 | 58.3 | 62.9 | 65 | 64.3 |
| Soft-Anneal (BBV) | 235 | 246 | 249 | 252 | 258 |
| A (HTV) | −3.051 | −2.784 | −3.016 | −2.646 | −3.456 |
| B (HTV) | 7518.3 | 7249.3 | 7992.5 | 7405.6 | 9313.2 |
| $T_0$ (HTV) | 132.2 | 134.3 | 65.6 | 96.5 | 27.3 |
| A (HTV + BBV) | −2.816 | −2.671 | −2.745 | −2.563 | −2.911 |
| B (HTV + BBV) | 7004.3 | 7001.80 | 7376.8 | 7221.5 | 7934.9 |
| $T_0$ (HTV + BBV) | 170.2 | 153 | 110.4 | 110.2 | 72.1 |
| 35 kP Temperature (° C.) | 1122 | 1124 | 1123 | 1126 | 1191 |
| 100 kP Temperature (° C.) | 1066 | 1066 | 1063 | 1065 | 1129 |
| 200 kP Temperature (° C.) | 1032 | 1031 | 1027 | 1028 | 1091 |
| Liquidus Temperature (° C.) | 1115 | 1100 | 1065 | 1045 | 1040 |
| Viscosity @ Liquidus Temperature (kP) | 40 | 53 | 96 | 145 | 550 |
| Sag Temperature (° C.) | 717 | 706 | 689 | 685 | 687 |
| [Annealing Point (° C.) + Softening Point (° C.)]/2 | 724 | 713 | 698 | 695 | 695 |
| Viscosity @ 600° C. | 3.02E+13 | 9.84E+12 | 2.10E+12 | 1.52E+12 | 1.32E+12 |
| Log viscosity @ 600° C. | 13.48 | 12.99 | 12.32 | 12.18 | 12.12 |
| Viscosity ratio @ 600° C. | 458.8 | 149.3 | 31.8 | 23.0 | 20 |
| Log viscosity ratio @ 600° C. | 1.2 | 1.2 | 1.1 | 1.1 | 1.1 |
| Viscosity @ 615° C. | 8.53E+12 | 3.05E+12 | 7.48E+12 | 5.5 E+12 | 5.07E+12 |
| Log viscosity @ 615° C. | 12.93 | 12.48 | 11.87 | 11.74 | 11.7 |
| Viscosity ratio @ 615° C. | 431.5 | 154.3 | 37.8 | 28 | 25.67 |
| Log viscosity ratio @ 615° C. | 1.3 | 1.2 | 1.2 | 1.1 | 1.1 |
| Viscosity @ 630° C. | 2.61E+12 | 1.02E+12 | 2.83E+11 | 2.14E+11 | 2.05E+11 |
| Log viscosity @ 630° C. | 12.42 | 12.01 | 11.45 | 11.33 | 11.31 |
| Viscosity ratio @ 630° C. | 400.4 | 155.9 | 43.4 | 32.7 | 31.4 |
| Log viscosity ratio @ 630° C. | 1.27 | 1.22 | 1.17 | 1.15 | 1.15 |
| d(log visc.)/dT @ 100 kP | −0.0086 | −0.0084 | −0.0080 | −0.0079 | −0.0077 |

TABLE 2

| Examples | 7 | 8 | 9 | 10 | 11 |
|---|---|---|---|---|---|
| $SiO_2$ | 65.1 | 65.1 | 65.0 | 65.1 | 64.6 |
| $Al_2O_3$ | 13.5 | 13.3 | 13.1 | 12.9 | 12.2 |
| $B_2O_3$ | 7.2 | 7.3 | 7.5 | 7.8 | 8.2 |
| $P_2O_5$ | 0.2 | 0.4 | 0.7 | 1.0 | 1.8 |
| $Li_2O$ | 6.1 | 6.1 | 6.0 | 5.7 | 5.5 |
| $Na_2O$ | 6.7 | 6.5 | 6.4 | 6.3 | 6.3 |
| $K_2O$ | 0.6 | 0.6 | 0.7 | 0.9 | 1.1 |
| MgO | 0.63 | 0.53 | 0.42 | 0.33 | 0.15 |
| CaO | 0.00 | 0.00 | 0.00 | 0.00 | 0.00 |
| SrO | 0.00 | 0.00 | 0.00 | 0.00 | 0.00 |
| $SnO_2$ | 0.05 | 0.06 | 0.06 | 0.06 | 0.07 |
| β-OH | — | — | 0.659 | 0.677 | — |

TABLE 2-continued

| Examples | 7 | 8 | 9 | 10 | 11 |
|---|---|---|---|---|---|
| Strain Point (° C.) | 509 | 500 | 500 | 493 | 482 |
| Annealing Point (° C.) | 562 | 559 | 550 | 550 | 542 |
| Softening Point (° C.) | 819 | 812 | 807 | 812 | 799 |
| Density (g/cm$^3$) | 2.347 | 2.343 | 2.339 | 2.333 | 2.327 |
| Coefficient of Thermal Expansion × 10$^{-7}$ (1/° C.) | 64.4 | 64.6 | 65 | 64.5 | 64.7 |
| Soft-Anneal (BBV) | 257 | 253 | 257 | 262 | 257 |
| A (HTV) | −3.139 | −3.592 | −4.475 | −3.382 | −4.171 |
| B (HTV) | 8655.7 | 9882.1 | 12400.3 | 9702.1 | 11952 |
| $T_0$ (HTV) | 6.8 | −73.8 | −227.7 | −86.9 | −229.5 |
| A (HTV + BBV) | −2.76 | −2.93 | −3.17 | −2.60 | −2.76 |
| B (HTV + BBV) | 7711.92 | 8146.02 | 8767.05 | 7678.20 | 8122.35 |
| $T_0$ (HTV + BBV) | 77.08 | 50.50 | 9.49 | 62.04 | 28.57 |
| 35 kP Temperature (° C.) | 1133 | 1141 | 1147 | 1137 | 1142 |
| 100 kP Temperature (° C.) | 1070 | 1076 | 1081 | 1071 | 1074 |
| 200 kP Temperature (° C.) | 1032 | 1037 | 1041 | 1030 | 1032 |
| Liquidus Temperature (° C.) | 1015 | 1010 | 1000 | 995 | 905 |
| Viscosity @ Liquidus Temperature (kP) | 279 | 336 | 422 | 385 | 2312 |
| Sag Temperature (° C.) | 682 | 681 | 675 | 671 | 665 |
| [Annealing Point (° C.) + Softening Point (° C.)]/2 | 690 | 685 | 679 | 681 | 671 |
| Viscosity @ 600° C. | 9.78E+11 | 7.86E+11 | 4.76E+11 | 4.67E+11 | 2.85E+11 |
| Log viscosity @ 600° C. | 11.99 | 11.90 | 11.68 | 11.67 | 11.45 |
| Viscosity ratio @ 600° C. | 14.8 | 11.9 | 7.2 | 7.1 | 4.3 |
| Log viscosity ratio @ 600° C. | 1.1 | 1.1 | 1.1 | 1.1 | 1.1 |
| Viscosity @ 615° C. | 3.79E+11 | 3.17E+11 | 2.04E+11 | 1.92E+11 | 1.23E+11 |
| Log viscosity @ 615° C. | 11.58 | 11.50 | 11.31 | 11.28 | 11.09 |
| Viscosity ratio @ 615° C. | 19.20 | 16 | 10.3 | 9.7 | 6.2 |
| Log viscosity ratio @ 615° C. | 1.1 | 1.1 | 1.1 | 1.1 | 1.1 |
| Viscosity @ 630° C. | 1.55E+11 | 1.34E+11 | 9.12E+10 | 8.24E+10 | 5.57E+10 |
| Log viscosity @ 630° C. | 11.19 | 11.13 | 10.96 | 10.92 | 10.75 |
| Viscosity ratio @ 630° C. | 23.7 | 20.6 | 14.0 | 12.6 | 8.5 |
| Log viscosity ratio @ 630° C. | 1.14 | 1.13 | 1.12 | 1.11 | 1.09 |
| d(log visc.)/dT @ 100 kP | −0.0077 | −0.0075 | −0.0072 | −0.0072 | −0.0070 |

TABLE 2

| Examples | 12 | 13 | 14 | 15 | 16 | 17 |
|---|---|---|---|---|---|---|
| $SiO_2$ | 64.59 | 64.82 | 64.71 | 64.84 | 71.13 | 70.55 |
| $Al_2O_3$ | 12.20 | 12.02 | 12.00 | 12.01 | 8.24 | 8.07 |
| $B_2O_3$ | 8.44 | 8.57 | 8.66 | 8.64 | 8.11 | 9.13 |
| $P_2O_5$ | 1.79 | 2.09 | 2.07 | 2.10 | 2.48 | 2.49 |
| $Li_2O$ | 5.29 | 4.96 | 4.92 | 4.84 | 4.53 | 3.38 |
| $Na_2O$ | 6.29 | 6.19 | 6.30 | 6.20 | 5.37 | 6.19 |
| $K_2O$ | 1.12 | 1.22 | 1.21 | 1.23 | 0.05 | 0.00 |
| MgO | 0.15 | 0.02 | 0.02 | 0.02 | 0.01 | 0.01 |
| CaO | 0.00 | 0.00 | 0.00 | 0.00 | 0.00 | 0.00 |
| SrO | 0.00 | 0.00 | 0.00 | 0.00 | 0.00 | 0.00 |
| $SnO_2$ | 0.07 | 0.08 | 0.08 | 0.09 | 0.06 | 0.13 |
| β-OH | — | — | 0.722 | — | — | — |
| Strain Point (° C.) | 481 | 484 | 478 | 486 | 486 | 475 |
| Annealing Point (° C.) | 531 | 530 | 533 | 527 | 536 | 523 |
| Softening Point(° C.) | 792 | 783 | 782 | 777 | 807 | 777 |
| Density (g/cm$^3$) | 2.323 | 2.321 | 2.321 | 2.320 | 2.285 | 2.287 |
| Coefficient of Thermal Expansion × 10$^{-7}$ (1/° C.) | 64.7 | 64.8 | 64.1 | 64.1 | 53.5 | 54.7 |
| Soft-Anneal (BBV) | 261 | 253 | 249 | 252 | 271 | 2 |
| A (HTV) | −2.857 | −3.62 | −4.329 | −3.613 | −2.982 | −2.67 |
| B (HTV) | 8664.1 | 10656.6 | 12690.6 | 10693.1 | 10031 | 9250.1 |
| To (HTV) | −42.8 | −172.6 | −289.9 | −179.6 | −173 | −128 |
| A (HTV + BBV) | −2.42 | −2.63 | −2.74 | −2.61 | −1.83 | −1.815 |
| B (HTV + BBV) | 7535.40 | 7966.26 | 8187.62 | 7954.04 | 6925.10 | 6998.53 |
| To (HTV + BBV) | 44.75 | 21.95 | 15.62 | 18.96 | 71.85 | 52.41 |
| 35kP Temperature (° C.) | 1128 | 1133 | 1140 | 1131 | 1160 | 1154 |
| 100 kP Temperature (° C.) | 1060 | 1064 | 1070 | 1062 | 1084 | 1078 |
| 200 kP Temperature (° C.) | 1019 | 1022 | 1028 | 1020 | 1038 | 1032 |
| Liquidus Temperature (° C.) | 905 | 835 | 835 | — | 950 | 905 |
| Viscosity @ Liquidus Temperature (kP) | 1924 | 9041 | 8965 | — | 892 | 1926 |
| SagTemperature (° C.) | 652 | 653 | 658 | 650 | 657 | 645 |

TABLE 2-continued

| Examples | 12 | 13 | 14 | 15 | 16 | 17 |
|---|---|---|---|---|---|---|
| [Annealing Point (° C.) + Softening Point (° C.)]/2 | 661 | 657 | 658 | 653 | 672 | 650 |
| Viscosity @ 600° C. | 1.42E+11 | 1.42E+11 | 1.85E+11 | 1.20E+11 | 1.93E+11 | 9.23E+10 |
| Log viscosity @ 600° C. | 11.15 | 11.15 | 11.27 | 11.08 | 11.29 | 10.97 |
| Viscosity ratio @ 600 ° C. | 2.2 | 2.2 | 2.8 | 1.8 | 2.9 | 1.4 |
| Log viscosity ratio @ 600° C. | 1 | 1 | 1 | 1 | 1 | 1 |
| Viscosity @ 615° C. | 6.26E+0 | 6.37E+10 | 8.23E+10 | 5.43E+10 | 8.38E+10 | 4.21E+10 |
| Log viscosity @ 615° C. | 10.80 | 10.80 | 10.92 | 10.73 | 10.92 | 10.62 |
| Viscosity ratio @ 615° C. | 3.19 | 3.22 | 4.18 | 2.7 | 4.24 | 2.14 |
| Log viscosityratio @ 615° C. | 1 | 1 | 1.1 | 1 | 1.1 | 1 |
| Viscosity @ 630° C. | 2.87E+10 | 2.97E+10 | 3.82E+10 | 2.55E+10 | 3.8E+10 | 2E+10 |
| Log viscosity @ 630° C. | 10.46 | 10.47 | 10.58 | 10.41 | 10.58 | 10.3 |
| Viscosity ratio @ 630° C. | 4.4 | 4.5 | 5.9 | 3.9 | 5.8 | 3.1 |
| Log viscosity ratio @ 630° C. | 1.07 | 1.07 | 1.08 | 1.06 | 1.08 | 1.05 |
| d(log visc.)/dT @ 100 kP | −0.0071 | −0.0070 | −0.0069 | −0.0069 | −0.0064 | −0.0064 |

Figure 6:
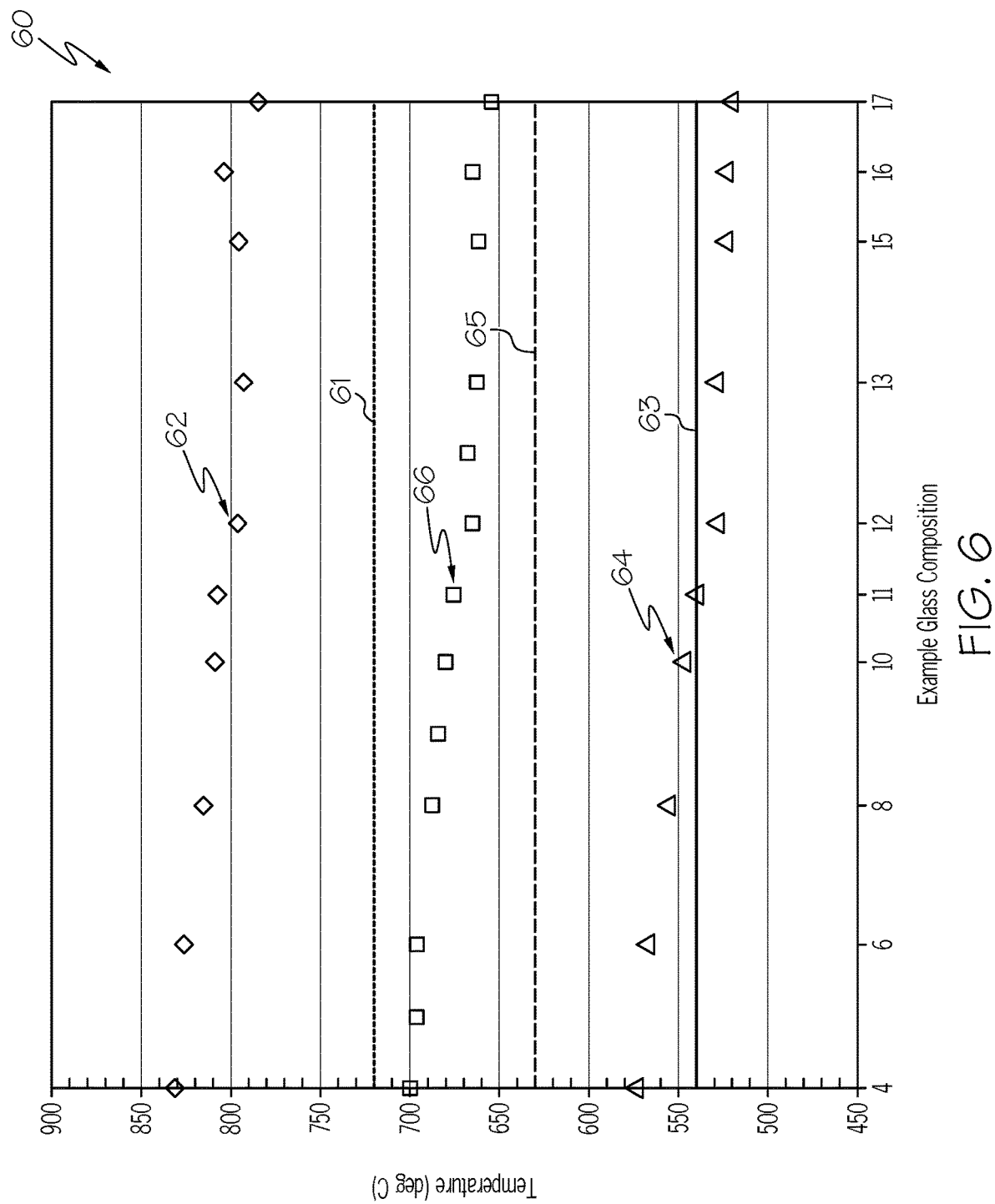
FIG. 6 graphically depicts the softening point, and the annealing point, and the average of the softening and annealing points of various example glass article compositions, according to one or more embodiments shown and described herein.

Referring now to FIG. 6, a graph 60 depicts the softening point, the annealing point, and the relationship $$\frac{T_A + T_S}{2}$$

for some of the example glass compositions described in Tables 1 and 2. In particular, line 61 depicts the softening point of the example glass composition 1 from Table 1, which may be the first glass article 110 in the embodiments described herein. Further, line 63 depicts the annealing point of the example glass composition 1 from Table 1 and line 65 depicts the relationship $$\frac{T_A + T_S}{2}$$

of the example glass composition 1 from Table 1.

Data points 62 (represented by diamond shapes) depict the softening points of various example glass compositions of Table 2, as listed along the X-axis, each of which may be the second glass article 120 in the embodiments described herein. Data points 64 (represented by triangle shapes) depict the annealing points of various example glass compositions of Table 2, as listed along the X-axis, each of which may be the second glass article 120 in the embodiments described herein. Furthermore, data points 66 depict the relationship $$\frac{T_A + T_S}{2}$$

of various example glass compositions of Table 2, as listed along the X-axis, each of which may be the second glass article 120 in the embodiments described herein.

Figure 7:
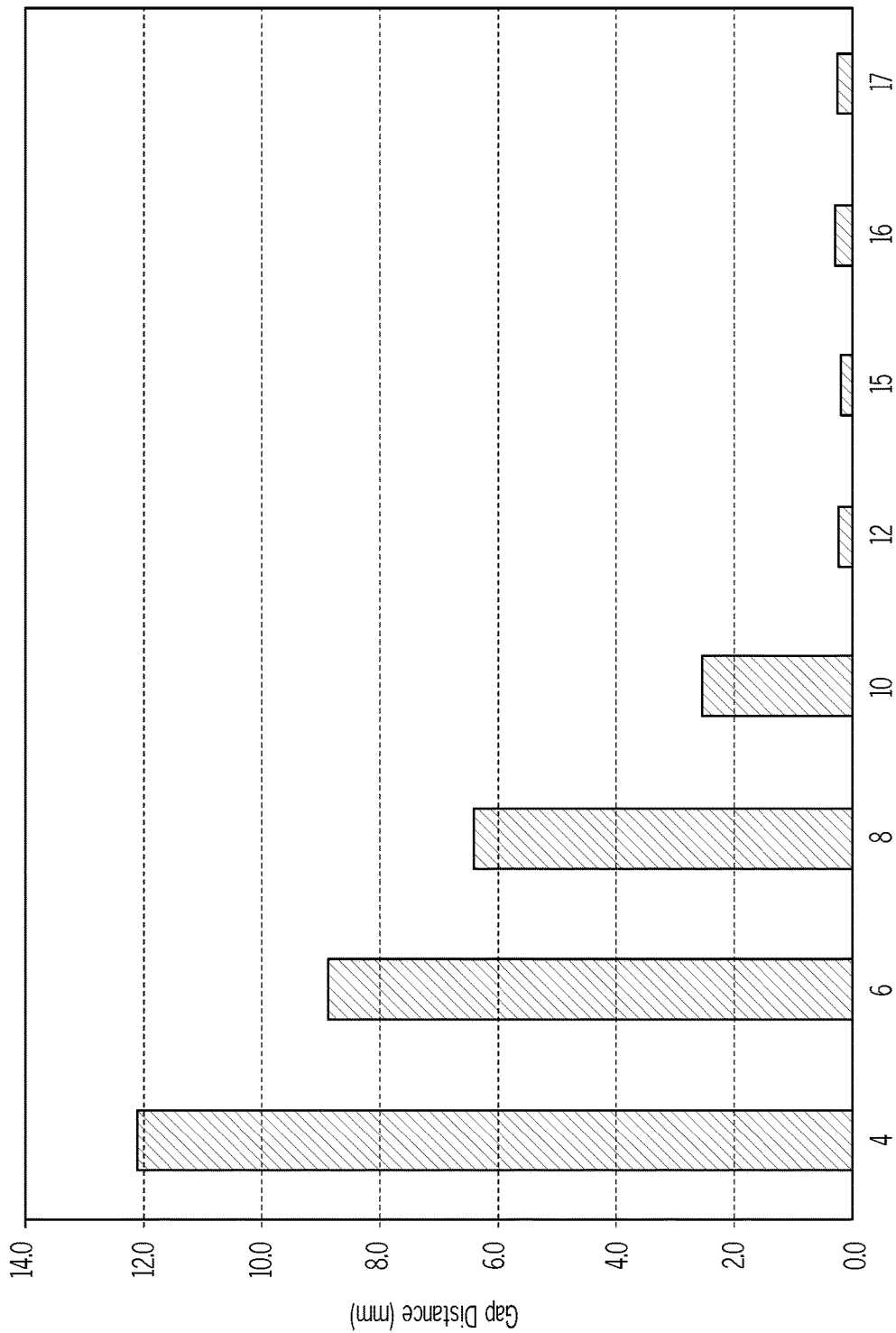
FIG. 7 graphically depicts a gap distance between pair sagged glass articles of various example glass article compositions, according to one or more embodiments shown and described herein.

Referring now to FIG. 7, a graph 70 depicts a gap distance in millimeters (mm) between an example first glass article 110 that comprises the glass composition listed in example 1 of Table 1 and an example second glass article 120 that comprises various example glass compositions of Table 2, as listed along the X-axis. For example, the gap distance between example composition 1 and example composition 4 is about 12.1 mm, the gap distance between example composition 1 and example composition 6 is about 9 mm, the gap distance between example composition 1 and example composition 8 is about 6.2 mm, the gap distance between example composition 1 and example composition 10 is about 2.5 mm, the gap distance between example composition 1 and example composition 12 is about 0.2 mm, the gap distance between example composition 1 and example composition 15 is about 0.2 mm, the gap distance between example composition 1 and example composition 16 is about 0.3 mm, and the gap distance between example composition 1 and example composition 17 is about 0.2 mm.

According to an aspect (1) of the present disclosure, a laminate is provided. The laminate comprises: a first glass article comprising a first thickness, a first annealing point ($T_{A1}$), and a first softening point ($T_{S1}$); a second glass article comprising a second thickness, a second annealing point ($T_{A2}$), and a second softening point ($T_{S2}$); and an interlayer disposed between the first glass article and the second glass article, wherein: the first thickness is greater than the second thickness; the second annealing point ($T_{A2}$) is less than or equal to the first annealing point ($T_{A1}$); and the second softening point ($T_{S2}$) is greater than the first softening point ($T_{S1}$).

According to an aspect (2) of the present disclosure, the laminate of aspect (1) is provided, wherein: the first glass article comprises a first sag depth; the second glass article comprises a second sag depth; and the first sag depth is within 5% of the second sag depth.

According to an aspect (3) of the present disclosure, the laminate of aspect (1) or (2) is provided, wherein: the first glass article comprises a first arcuate surface; the second glass article comprises a second arcuate surface; and the first arcuate surface and the second arcuate surface are shaped such that when the first glass article is stacked in contact with the second glass article a gap distance between the first glass article and the second glass article is about 1 mm or less.

According to an aspect (4) of the present disclosure, the laminate of any of aspects (1)-(3) is provided, wherein a glass composition of the second glass article comprises: $SiO_2$ in an amount in a range from about 64 mol % to about 72 mol %; $Al_2O_3$ in an amount in a range from about 8 mol % to about 13 mol %; $P_2O_5$ in an amount in a range from about 1 mol % to about 3 mol %; and MgO in an amount in a range from about 0 mol % to about 2 mol %.

According to an aspect (5) of the present disclosure, the laminate of aspect (4) is provided, wherein the glass composition of the second glass article further comprises $Na_2O$ in an amount in a range from about 4 mol % to about 8 mol %.

According to an aspect (6) of the present disclosure, the laminate of aspect (4) or (5) is provided, wherein the glass composition further comprises K$_2$O in an amount in a range from about 0 mol % to about 1.5 mol %.

According to an aspect (7) of the present disclosure, the laminate of any of aspects (4)-(6) is provided, wherein the glass composition of the second glass article further comprises B$_2$O$_3$ in an amount in a range from about 7 mol % to about 10 mol %.

According to an aspect (8) of the present disclosure, the laminate of any of aspects (4)-(7) is provided, wherein the glass composition of the second glass article further comprises Li$_2$O in an amount in a range from about 3 mol % to about 6 mol %.

According to an aspect (9) of the present disclosure, the laminate of any of aspects (4)-(8) is provided, wherein the glass composition of the second glass article further comprises SnO$_2$ in an amount in a range from about 0 mol % to about 0.25 mol %.

According to an aspect (10) of the present disclosure, the laminate of any of aspects (4)-(9) is provided, wherein the glass composition of the second glass article comprises a total amount of alkali metal oxides in a range from about 5 mol % to about 20 mol %.

According to an aspect (11) of the present disclosure, the laminate of any of aspects (1)-(10) is provided, wherein the second glass article comprises a viscosity at a liquidus temperature of the second glass article comprises about 50 kP or greater.

According to an aspect (12) of the present disclosure, the laminate of any of aspects (1)-(11) is provided, wherein the second glass article comprises a viscosity at a liquidus temperature of the second glass article comprises about 500 kP or greater.

According to an aspect (13) of the present disclosure, the laminate of any of aspects (1)-(12) is provided, wherein the first glass article comprises soda lime glass.

According to an aspect (14) of the present disclosure, the laminate of any of aspects (1)-(13) is provided, wherein the second glass article comprises an alkali aluminosilicate glass, an alkali containing borosilicate glass, an alkali aluminophosphosilicate glass, or an alkali aluminoborosilicate glass.

According to an aspect (15) of the present disclosure, the laminate of any of aspects (1)-(14) is provided, wherein the first thickness is from about 1 mm to about 3 mm.

According to an aspect (16) of the present disclosure, the laminate of aspect (15) is provided, wherein the first thickness is from about 2 mm to about 2.5 mm.

According to an aspect (17) of the present disclosure, the laminate of any of aspects (1)-(16) is provided, wherein the second thickness is from about 0.2 mm to about 1 mm.

According to an aspect (18) of the present disclosure, the laminate of aspect (17) is provided, wherein the second thickness is from about 0.5 mm to about 0.8 mm.

According to an aspect (19) of the present disclosure, the laminate of any of aspects (1)-(18) is provided, wherein the second glass article comprises a temperature at a viscosity of 35 kP of from about 1125° C. to about 1165° C.

According to an aspect (20) of the present disclosure, the laminate of any of aspects (1)-(19) is provided, wherein the second glass article comprises a temperature at a viscosity of 100 kP of from about 1060° C. to about 1085° C.

According to an aspect (21) of the present disclosure, the laminate of any of aspects (1)-(20) is provided, wherein the second glass article comprises a temperature at a viscosity of 200 kP of from about 1015° C. to about 1040° C.

According to an aspect (22) of the present disclosure, the laminate of any of aspects (1)-(21) is provided, wherein the second glass article is strengthened.

According to an aspect (23) of the present disclosure, the laminate of aspect (22) is provided, wherein the second glass article is chemically strengthened.

According to an aspect (24) of the present disclosure, the laminate of any of aspects (1)-(23) is provided, wherein: the first annealing point comprises from about 535° C. to about 550° C.; and the second annealing point comprises from about 520° C. to about 535° C.

According to an aspect (25) of the present disclosure, the laminate of any of aspects (1)-(24) is provided, wherein: the first glass article comprises a first strain point of from about 495° C. to about 505° C.; and the second glass article comprises a second strain point of from about 470° C. to about 490° C.

According to an aspect (26) of the present disclosure, the laminate of any of aspects (1)-(25) is provided, wherein: the first softening point comprises from about 715° C. to about 735° C.; and the second softening point comprises from about 770° C. to about 810° C.

According to an aspect (27) of the present disclosure, the laminate of any of aspects (1)-(26) is provided, wherein: the first glass article comprises a density of from about 2.4 g/cm3 to about 2.6 g/cm3; and the second glass article comprises a density of from about 2.2 g/cm3 to about 2.4 g/cm3.

According to an aspect (28) of the present disclosure, the laminate of any of aspects (1)-(27) is provided, wherein: the first glass article comprises a CTE of from about 80×10-7° C. to about 90×10-7° C.; and the second glass article comprises a CTE of from about 52×10-7° C. to about 65×10-7° C.

According to an aspect (29) of the present disclosure, the laminate of any of aspects (1)-(28) is provided, wherein: a difference in magnitude between the first annealing point and the first softening point of from about 180° C. to about 185° C.; and a difference in magnitude between the second annealing point and the second softening point of from about 240° C. to about 280° C.

According to an aspect (30) of the present disclosure, the laminate of any of aspects (1)-(29) is provided, wherein $$\frac{T_{A1} + T_{S1}}{2} \leq \frac{T_{A2} + T_{S2}}{2} \leq \left(\frac{T_{A1} + T_{S1}}{2} + 50° \text{ C.}\right)$$

According to an aspect (31) of the present disclosure, the laminate of any of aspects (1)-(30) is provided, wherein:

$$\frac{T_{A1} + T_{S1}}{2}$$

is from about 620° C. to about 640° C.; and $$\frac{T_{A2} + T_{S2}}{2}$$

is from about 650° C. to about 670° C.

According to an aspect (32) of the present disclosure, the laminate of any of aspects (1)-(31) is provided, wherein the first glass article comprises a d(log viscosity)/dT at 100 kP of from about −0.01 to about −0.02 and the second glass article comprises a d(log viscosity)/dT at 100 kP of from about −0.006 to about −0.009.

According to an aspect (33) of the present disclosure, the laminate of any of aspects (1)-(32) is provided, wherein the second glass article comprises a sag temperature of from about 640° C. to about 690° C.

According to an aspect (34) of the present disclosure, the laminate of any of aspects (1)-(33) is provided, wherein the interlayer comprises a polyvinyl butyral, an acoustic polyvinyl butyral, an ionomer, an ethylene-vinyl acetate, a thermoplastic polyurethane, a polyester, a polyethylene terephthalate, or a combination thereof.

According to an aspect (35) of the present disclosure, the laminate of any of aspects (1)-(34) is provided, wherein the laminate is disposed in an opening of a vehicle, the vehicle further comprising a body defining an interior and the opening in communication with the interior.

According to an aspect (36) of the present disclosure, the laminate of aspect (35) is provided, wherein the second glass article faces the interior, and the first glass article face an exterior of the vehicle.

According to an aspect (37) of the present disclosure, a laminate is provided. The laminate comprising: a first glass article comprising a first thickness, a first annealing point ($T_{A1}$), and a first softening point ($T_{S1}$); a second glass article comprising a second thickness, a second annealing point ($T_{A2}$), and a second softening point ($T_{S2}$); and an interlayer disposed between the first glass article and the second glass article, wherein: the first thickness is greater than the second thickness; the second softening point ($T_{S2}$) is greater than the first softening point ($T_{S1}$); and $$\frac{T_{A1}+T_{S1}}{2} \leq \frac{T_{A2}+T_{S2}}{2} \leq \left(\frac{T_{A1}+T_{S1}}{2}+50°\text{ C.}\right)$$

According to an aspect (38) of the present disclosure, the laminate of aspect (37) is provided, wherein: the first glass article comprises a first sag depth; the second glass article comprises a second sag depth; and the first sag depth is within 5% of the second sag depth.

According to an aspect (39) of the present disclosure, the laminate of aspect (37) or (38) is provided, wherein: the first glass article comprises a first arcuate surface; the second glass article comprises a second arcuate surface; and the first arcuate surface and the second arcuate surface are shaped such that when the first glass article is stacked in contact with the second glass article a gap distance between the first glass article and the second glass article is about 1 mm or less.

According to an aspect (40) of the present disclosure, the laminate of any of aspects (37)-(39) is provided, wherein a glass composition of the second glass article comprises: $SiO_2$ in an amount in a range from about 64 mol % to about 72 mol %; $Al_2O_3$ in an amount in a range from about 8 mol % to about 13 mol %; $P_2O_5$ in an amount in a range from about 1 mol % to about 3 mol %; and MgO in an amount in a range from about 0 mol % to about 2 mol %.

According to an aspect (41) of the present disclosure, the laminate of aspect (40) is provided, wherein the glass composition of the second glass article further comprises $Na_2O$ in an amount in a range from about 4 mol % to about 8 mol %.

According to an aspect (42) of the present disclosure, the laminate of any of aspects (40)-(41) is provided, wherein the glass composition further comprises $K_2O$ in an amount in a range from about 0 mol % to about 1.5 mol %.

According to an aspect (43) of the present disclosure, the laminate of any of aspects (40)-(42) is provided, wherein the glass composition of the second glass article further comprises $B_2O_3$ in an amount in a range from about 7 mol % to about 10 mol %.

According to an aspect (44) of the present disclosure, the laminate of any of aspects (40)-(43) is provided, wherein the glass composition of the second glass article further comprises $Li_2O$ in an amount in a range from about 3 mol % to about 6 mol %.

According to an aspect (45) of the present disclosure, the laminate of any of aspects (40)-(44) is provided, wherein the glass composition of the second glass article further comprises $SnO_2$ in an amount in a range from about 0 mol % to about 0.25 mol %.

According to an aspect (46) of the present disclosure, the laminate of any of aspects (40)-(45) is provided, wherein the glass composition of the second glass article comprises a total amount of alkali metal oxides in a range from about 5 mol % to about 20 mol %.

According to an aspect (47) of the present disclosure, the laminate of any of aspects (37)-(46) is provided, wherein the second glass article comprises a viscosity at a liquidus temperature of the second glass article comprises about 50 kP or greater.

According to an aspect (48) of the present disclosure, the laminate of any of aspects (37)-(47) is provided, wherein the second glass article comprises a viscosity at a liquidus temperature of the second glass article comprises about 500 kP or greater.

According to an aspect (49) of the present disclosure, the laminate of any of aspects (37)-(48) is provided, wherein the first glass article comprises soda lime glass.

According to an aspect (50) of the present disclosure, the laminate of any of aspects (37)-(49) is provided, wherein the second glass article comprises an alkali aluminosilicate glass, an alkali containing borosilicate glass, an alkali aluminophosphosilicate glass, or an alkali aluminoborosilicate glass.

According to an aspect (51) of the present disclosure, the laminate of any of aspects (37)-(50) is provided, wherein the first thickness is from about 1 mm to about 3 mm.

According to an aspect (52) of the present disclosure, the laminate of aspect (51) is provided, wherein the first thickness is from about 2 mm to about 2.5 mm.

According to an aspect (53) of the present disclosure, the laminate of any of aspects (37)-(52) is provided, wherein the second thickness is from about 0.2 mm to about 1 mm.

According to an aspect (54) of the present disclosure, the laminate of aspect (53) is provided, wherein the second thickness is from about 0.5 mm to about 0.8 mm.

According to an aspect (55) of the present disclosure, the laminate of any of aspects (37)-(54) is provided, wherein the second glass article comprises a temperature at a viscosity of 35 kP of from about 1125° C. to about 1165° C.

According to an aspect (56) of the present disclosure, the laminate of any of aspects (37)-(55) is provided, wherein the second glass article comprises a temperature at a viscosity of 100 kP of from about 1060° C. to about 1085° C.

According to an aspect (57) of the present disclosure, the laminate of any of aspects (37)-(56) is provided, wherein the second glass article comprises a temperature at a viscosity of 200 kP of from about 1015° C. to about 1040° C.

According to an aspect (58) of the present disclosure, the laminate of any of aspects (37)-(57) is provided, wherein the second glass article is strengthened.

According to an aspect (59) of the present disclosure, the laminate of aspect (58) is provided, wherein the second glass article is chemically strengthened.

According to an aspect (60) of the present disclosure, the laminate of any of aspects (37)-(59) is provided, wherein: the first annealing point comprises from about 535° C. to about 545° C.; and the second annealing point comprises from about 520° C. to about 535° C.

According to an aspect (61) of the present disclosure, the laminate of any of aspects (37)-(60) is provided, wherein: the first glass article comprises a first strain point of from about 495° C. to about 505° C.; and the second glass article comprises a second strain point of from about 470° C. to about 490° C.

According to an aspect (62) of the present disclosure, the laminate of any of aspects (37)-(61) is provided, wherein: the first softening point comprises from about 715° C. to about 735° C.; and the second softening point comprises from about 770° C. to about 810° C.

According to an aspect (63) of the present disclosure, the laminate of any of aspects (37)-(62) is provided, wherein: the first glass article comprises a density of from about 2.4 g/cm3 to about 2.6 g/cm3; and the second glass article comprises a density of from about 2.2 g/cm3 to about 2.4 g/cm3.

According to an aspect (64) of the present disclosure, the laminate of any of aspects (37)-(63) is provided, wherein: the first glass article comprises a CTE of from about 80×10-7° C. to about 90×10-7° C.; and the second glass article comprises a CTE of from about 52×10-7° C. to about 65×10-7° C.

According to an aspect (66) of the present disclosure, the laminate of any of aspects (37)-(64) is provided, wherein: a difference in magnitude between the first annealing point and the first softening point of from about 180° C. to about 185° C.; and a difference in magnitude between the second annealing point and the second softening point of from about 240° C. to about 280° C.

According to an aspect (66) of the present disclosure, the laminate of any of aspects (37)-(65) is provided, wherein:

$$\frac{T_{A1} + T_{S1}}{2}$$

is from about 620° C. to about 640° C.; and $$\frac{T_{A2} + T_{S2}}{2}$$

is from about 650° C. to about 670° C.

According to an aspect (67) of the present disclosure, the laminate of any of aspects (37)-(66) is provided, wherein the first glass article comprises a d(log viscosity)/dT at 100 kP of from about −0.01 to about −0.02 and the second glass article comprises a d(log viscosity)/dT at 100 kP of from about −0.006 to about −0.009.

According to an aspect (68) of the present disclosure, the laminate of any of aspects (37)-(67) is provided, wherein the second glass article comprises a sag temperature of from about 640° C. to about 690° C.

According to an aspect (69) of the present disclosure, the laminate of any of aspects (37)-(68) is provided, wherein the interlayer comprises a polyvinyl butyral, an acoustic polyvinyl butyral, an ionomer, an ethylene-vinyl acetate, a thermoplastic polyurethane, a polyester, a polyethylene terephthalate, or a combination thereof.

According to an aspect (70) of the present disclosure, the laminate of any of aspects (37)-(69) is provided, wherein the laminate is disposed in an opening of a vehicle, the vehicle further comprising a body defining an interior and the opening in communication with the interior.

According to an aspect (71) of the present disclosure, the laminate of aspect (70) is provided, wherein the second glass article faces the interior, and the first glass article face an exterior of the vehicle.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

What is claimed is:

1. A laminate comprising:
    a first glass article comprising a first thickness, a first annealing point ($T_{A1}$), and a first softening point ($T_{S1}$);
    a second glass article comprising a second thickness, a second annealing point ($T_{A2}$), and a second softening point ($T_{S2}$); and
    an interlayer disposed between the first glass article and the second glass article, wherein:
        the first thickness is greater than the second thickness;
        the second annealing point ($T_{A2}$) is less than or equal to the first annealing point ($T_{A1}$); and
        the second softening point ($T_{S2}$) is greater than the first softening point ($T_{S1}$).

2. The laminate of claim 1, wherein $$\frac{T_{A1} + T_{S1}}{2} \leq \frac{T_{A2} + T_{S2}}{2} \leq \left(\frac{T_{A1} + T_{S1}}{2} + 50° \text{ C.}\right).$$

3. The laminate of claim 1, wherein:
the first glass article comprises a first sag depth;
the second glass article comprises a second sag depth; and
the first sag depth is within 5% of the second sag depth.

4. The laminate of claim 1, wherein:
the first glass article comprises a first arcuate surface;
the second glass article comprises a second arcuate surface; and
the first arcuate surface and the second arcuate surface are shaped such that when the first glass article is stacked in contact with the second glass article a gap distance between the first glass article and the second glass article is about 1 mm or less.

5. The laminate of claim 1, wherein a glass composition of the second glass article comprises:
$SiO_2$ in an amount in a range from about 64 mol % to about 72 mol %;
$Al_2O_3$ in an amount in a range from about 8 mol % to about 13 mol %;
$P_2O_5$ in an amount in a range from about 1 mol % to about 3 mol %; and
MgO in an amount in a range from about 0 mol % to about 2 mol %.

6. The laminate of claim 5, wherein the glass composition of the second glass article further comprises at least one of: $Na_2O$ in an amount in a range from about 4 mol % to about 8 mol %; $K_2O$ in an amount in a range from about 0 mol % to about 1.5 mol %; $B_2O_3$ in an amount in a range from about 7 mol % to about 10 mol %; $Li_2O$ in an amount in a range from about 3 mol % to about 6 mol %; or $SnO_2$ in an amount in a range from about 0 mol % to about 0.25 mol %.

7. The laminate of claim 1, wherein the glass composition of the second glass article comprises a total amount of alkali metal oxides in a range from about 5 mol % to about 20 mol %.

8. The laminate of claim 1, wherein the second glass article comprises a viscosity at a liquidus temperature of the second glass article of about 50 kP or greater.

9. The laminate of claim 1, wherein the second glass article comprises a viscosity at a liquidus temperature of the second glass article of about 500 kP or greater.

10. The laminate of claim 1, wherein the first glass article comprises soda lime glass.

11. The laminate of claim 1, wherein the second glass article comprises an alkali aluminosilicate glass, an alkali containing borosilicate glass, an alkali aluminophosphosilicate glass, or an alkali aluminoborosilicate glass.

12. The laminate of claim 1, wherein the first thickness is from about 1 mm to about 3 mm.

13. The laminate of claim 1, wherein the second thickness is from about 0.2 mm to about 1 mm.

14. The laminate of claim 1, wherein the second glass article comprises a temperature at a viscosity of 35 kP of from about 1125° C. to about 1165° C.

15. The laminate of claim 1, wherein the second glass article comprises a temperature at a viscosity of 100 kP of from about 1060° C. to about 1085° C.

16. The laminate of claim 1, wherein the second glass article comprises a temperature at a viscosity of 200 kP of from about 1015° C. to about 1040° C.

17. The laminate of claim 1, wherein the second glass article is strengthened.

18. The laminate of claim 17, wherein the second glass article is chemically strengthened.

19. The laminate of claim 1, wherein:
the first annealing point is from about 535° C. to about 550° C.; and
the second annealing point is from about 520° C. to about 535° C.

20. The laminate of claim 1, wherein:
the first glass article comprises a first strain point of from about 495° C. to about 505° C.; and
the second glass article comprises a second strain point of from about 470° C. to about 490° C.

21. The laminate of claim 1, wherein:
the first softening point comprises from about 715° C. to about 735° C.; and
the second softening point comprises from about 770° C. to about 810° C.

22. The laminate of claim 1, wherein:
the first glass article comprises a density of from about 2.4 $g/cm^3$ to about 2.6 $g/cm^3$; and
the second glass article comprises a density of from about 2.2 $g/cm^3$ to about 2.4 $g/cm^3$.

23. The laminate of claim 1, wherein:
the first glass article comprises a CTE of from about $80 \times 10^{-7}$ ° C. to about $90 \times 10^{-7}$ ° C.; and
the second glass article comprises a CTE of from about $52 \times 10^{-7}$ ° C. to about $65 \times 10^{-7}$ ° C.

24. The laminate of claim 1, wherein:
a difference in magnitude between the first annealing point and the first softening point is from about 180° C. to about 185° C.; and
a difference in magnitude between the second annealing point and the second softening point is from about 240° C. to about 280° C.

25. The laminate of claim 1, wherein:

$$\frac{T_{A1} + T_{S1}}{2}$$

is from about 620° C. to about 640° C.; and $$\frac{T_{A2} + T_{S2}}{2}$$

is from about 650° C. to about 670° C.

26. The laminate of claim 1, wherein the first glass article comprises a d(log viscosity)/dT at 100 kP of from about −0.01 to about −0.02 and the second glass article comprises a d(log viscosity)/dT at 100 kP of from about −0.006 to about −0.009.

27. The laminate of claim 1, wherein the interlayer comprises a polyvinyl butyral, an acoustic polyvinyl butyral, an ionomer, an ethylene-vinyl acetate, a thermoplastic polyurethane, a polyester, a polyethylene terephthalate, or a combination thereof.

28. The laminate of claim 1, wherein the laminate is disposed in an opening of a vehicle, the vehicle further comprising a body defining an interior and the opening is in communication with the interior.

29. The laminate of claim 28, wherein the second glass article faces the interior, and the first glass article faces an exterior of the vehicle.

* * * * *